(12) United States Patent
Lee et al.

(10) Patent No.: US 12,184,606 B2
(45) Date of Patent: Dec. 31, 2024

(54) METHOD AND DEVICE FOR EDGE APPLICATION SERVER DISCOVERY

(71) Applicant: Samsung Electronics Co., Ltd., Suwon-si (KR)

(72) Inventors: Jicheol Lee, Suwon-si (KR); Hyesung Kim, Suwon-si (KR); Sangsoo Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/362,360

(22) Filed: Jul. 31, 2023

(65) Prior Publication Data
US 2024/0022541 A1 Jan. 18, 2024

Related U.S. Application Data

(63) Continuation of application No. 17/674,287, filed on Feb. 17, 2022, now Pat. No. 11,729,137.

(30) Foreign Application Priority Data

Feb. 18, 2021 (KR) ........................ 10-2021-0022193
May 7, 2021 (KR) ........................ 10-2021-0059456

(51) Int. Cl.
*H04L 61/4541* (2022.01)
*H04L 61/4511* (2022.01)

(52) U.S. Cl.
CPC ...... *H04L 61/4541* (2022.05); *H04L 61/4511* (2022.05)

(58) Field of Classification Search
None
See application file for complete search history.

(56) References Cited

U.S. PATENT DOCUMENTS

| | | |
|---|---|---|
| 11,019,531 B2 | 5/2021 | Nithiyanantham et al. |
| 2019/0363941 A1 | 11/2019 | Fujimoto et al. |

(Continued)

FOREIGN PATENT DOCUMENTS

| | | |
|---|---|---|
| CN | 110557753 A | 12/2019 |
| EP | 2953400 B1 | 5/2019 |

(Continued)

OTHER PUBLICATIONS

3Gpp et al—TR 23.748 V1.2.0 (Nov. 2020)—Technical Specification Group Services and System Aspects; Study on enhancement of support for Edge Computing in 5G Core network (3GPP hereinafter) (Year: 2020).*

(Continued)

*Primary Examiner* — Younes Naji
(74) *Attorney, Agent, or Firm* — Jefferson IP Law, LLP

(57) ABSTRACT

The disclosure relates to a 5th generation (5G) communication system communication scheme and a system thereof to support a higher data rate than that of the 4th generation (4G) system. A method performed by an edge application server discover function (EASDF) to discover an edge application server (EAS) is provided. The method includes, receiving a context message including a DNS message processing rule from an session management function (SMF), receiving a DNS query message from a user equipment (UE), transmitting the processed DNS query message to a DNS server based on the DNS message processing rule, receiving a DNS response message including an EAS internet protocol (IP) address from the DNS server, and transmitting the DNS response message to the UE based on the DNS message processing rule.

16 Claims, 17 Drawing Sheets

(56) References Cited

U.S. PATENT DOCUMENTS

| | | | |
|---|---|---|---|
| 2020/0329008 A1* | 10/2020 | Dao | H04L 61/5007 |
| 2021/0352511 A1 | 11/2021 | Lee et al. | |
| 2023/0074694 A1* | 3/2023 | Xiong | H04L 63/1458 |
| 2023/0079126 A1 | 3/2023 | Mas Rosique et al. | |

FOREIGN PATENT DOCUMENTS

| | | |
|---|---|---|
| KR | 10-2021-0089560 A | 7/2021 |
| WO | 2022067829 A1 | 4/2022 |
| WO | 2022157667 A | 7/2022 |

OTHER PUBLICATIONS

ETSI TS 129 518—5G System; Access and Mobility Management Services; Stage 3 3GPP TS 29.518 version 16.4.0 Release 16) (Year: 2020).*

Huawei, HiSilicon, S2-2005366, KI #1: Evaluation of solutions and conclusions, 3GPP TSG-WG SA2 Meeting #140E e-meeting, Elbonia, Aug. 19-Sep. 1, 2020.

Tencent, S2-2007570, KI#1: Update the conclusion for the EAS discovery, KI #1: Approval, SA WG2 Meeting #141E, Elbonia, Oct. 12-Oct. 23, 2020.

International Search Report and written opinion dated May 30, 2022, issued in International Application No. PCT/KR2022/002423.

3GPP et al—TR 23.748 V1 .2.0 (Nov. 2020)—Technical Specification Group Services and System Aspects; Study on enhancement of support for Edge Computing in 5G Core network (Year: 2020).

Nicolaescu et al. Edge Data Repositories—The Design to store, process and sent system at the Edge (Year: 2020).

3GPP et al. TS 29.518 5G System; Access and Mobility Management Services; Stage 3 (Year: 2020).

3GPP; 3rd Generation Partnership Project; Technical Specification Group Services and System Aspects; Study on enhancement of support for Edge Computing in 5G core network(5GC) (Release 17); XP051999942; 3GPP TR 23.748 V17.0.0 (Dec. 2020); Valbonne, France; Dec. 17, 2020.

Extended European Search Report dated Aug. 26, 2024; European Appln. No. 22756545.4-1203 / 4278595 PCT/KR2022002423.

* cited by examiner

METHOD AND DEVICE FOR EDGE APPLICATION SERVER DISCOVERY

CROSS-REFERENCE TO RELATED APPLICATION(S)

This application is a continuation application of prior application Ser. No. 17/674,287 filed on Feb. 17, 2022, which has issued as U.S. Pat. No. 11,729,137 on Aug. 15, 2023; and which is based on and claims priority under 35 U.S.C. § 119(a) of a Korean patent application number 10-2021-0022193 filed on Feb. 18, 2021 in the Korean Intellectual Property Office, and of a Korean patent application number 10-2021-0059456 filed on May 7, 2021 in the Korean Intellectual Property Office, the disclosure of each of which is incorporated by reference herein in its entirety.

BACKGROUND

1. Field

The disclosure relates to a wireless communication system. More particularly, the disclosure relates to a method for an edge computing operator to inform a user equipment (UE) of the address of an edge application server registered in an edge computing-supported area when providing edge computing in a cellular wireless communication system (e.g., 5th generation (5G) system).

2. Description of Related Art

In order to meet the demand for wireless data traffic soaring since the 4th generation (4G) communication system came to the market, there are ongoing efforts to develop enhanced 5G communication systems or pre-5G communication systems. For the reasons, the 5G communication system or pre-5G communication system is called the beyond 4G network communication system or post long-term evolution (LTE) system.

For higher data transmit rates, 5G communication systems are considered to be implemented on ultra-high frequency bands (millimeter (mm) Wave), such as, e.g., 60 GHz. To mitigate pathloss on the ultra-high frequency band and increase the reach of radio waves, the following techniques are taken into account for the 5G communication system, beamforming, massive multi-input multi-output (MIMO), full dimensional MIMO (FD-MIMO), array antenna, analog beamforming, and large scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and interference cancellation.

There are also other various schemes under development for the 5G system including, e.g., hybrid frequency shift keying (FSK) and quadrature amplitude modulation (QAM) modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

Meanwhile, the 3rd generation partnership project (3GPP), which is in charge of cellular mobile communication standardization, has named the new core network structure 5G core (5GC) and standardized the same to promote the evolution from the legacy 4G LTE system to the 5G system.

5GC supports the following differentiated functions as compared to the evolved packet core (EPC), which is the legacy network core for 4G.

First, 5GC adopts the network slicing function. As a requirement of 5G, should support various types of terminals and services, e.g., enhanced mobile broadband (eMBB), ultra-reliable low latency communications (URLLC), or massive machine type communications (mMTC). These UEs/services have different requirements for the core network. For example, the eMBB service requires a high data rate while the URLLC service requires high stability and low latency. Network slicing is technology proposed to meet such various requirements.

Network slicing is a method for creating multiple logical networks by virtualizing one physical network, and the network slice instances (NSIs) may have different characteristics. Therefore, various service requirements may be met by allowing each NSI to have a network function (NF) suited for its characteristics. Various services may be efficiently supported by allocating an NSI meeting required service characteristics for each UE.

Second, 5GC may seamlessly support the network virtualization paradigm by separating the mobility management function and the session management function. In legacy 4G LTE, all UEs may receive services over the network through signaling exchange with a single core device called the mobility management entity (MME) in charge of registration, authentication, mobility management and session management functions. However, in 5G, the number of UEs explosively increases and mobility and traffic/session characteristics that need to be supported according to the type of UE are subdivided. Resultantly, if all functions are supported by a single device, such as MME, the scalability of adding entities for each required function may decrease. Accordingly, various functions are under development based on a structure that separates the mobility management function and the session management function to enhance the scalability in terms of function/implementation complexity of the core equipment in charge of the control plane and the signaling load.

The above information is presented as background information only to assist with an understanding of the disclosure. No determination has been made, and no assertion is made, as to whether any of the above might be applicable as prior art with regard to the disclosure.

SUMMARY

In a 5G core network supporting edge computing, when a UE transmits a request to a domain name system (DNS) server through a mobile communication network, the DNS server may not identify the position of the UE from the IP address of the UE connected to the Internet through the 3GPP system.

Aspects of the disclosure are to address at least the above-mentioned problems and/or disadvantages and to provide at least the advantages described below. Accordingly, an aspect of the disclosure is to provide a system of providing a UE with the address of an edge application server (EAS) available in a local network available in the UE's connected position, as a DNS response, in response to a DNS request transmitted from a UE through a 3GPP system.

Additional aspects will be set forth in part in the description which follows and, in part, will be apparent from the description, or may be learned by practice of the presented embodiments.

In accordance with an aspect of the disclosure, a method performed by an edge application server discover function (EASDF) to discover an EAS is provided. The method includes receiving EAS domain configuration information including an enhanced DNS client subnet ECS option from an edge application service domain repository (EDR), receiving a protocol data unit (PDU) session state report message including a DNS message processing rule from an session management function (SMF), receiving a DNS query message from a UE, processing the DNS query message based on the EAS domain configuration information and the PDU session state report message, transmitting the processed DNS query message to a DNS server, receiving a DNS response message including an EAS IP address from the DNS server in response to the processed DNS query message, and transmitting the DNS response message to the UE.

In accordance with another aspect of the disclosure, an EASDF to discover an EAS is provided. The EASDF includes a transceiver and a controller configured to control the transceiver to receive EAS domain configuration information including an ECS option from an EDR, control the transceiver to receive a PDU session state report message including a DNS message processing rule from a SMF, control the transceiver to receive a DNS query message from a UE, process the DNS query message based on the EAS domain configuration information and the PDU session state report message, control the transceiver to transmit the processed DNS query message to a DNS server, control the transceiver to receive, from the DNS server, a DNS response message including an EAS IP address in response to the processed DNS query message, and control the transceiver to transmit the DNS response message to the UE.

According to the disclosure, a UE having transferred a DNS request may identify the address of an EAS available in the UE's position through a 5G system. In other words, it is possible to search for the address of the EAS close to the position of the UE for each fully qualified domain name (FQDN). Through this process, the 5G system may activate the local network of the 5G core network at the time of requesting a service from the UE.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
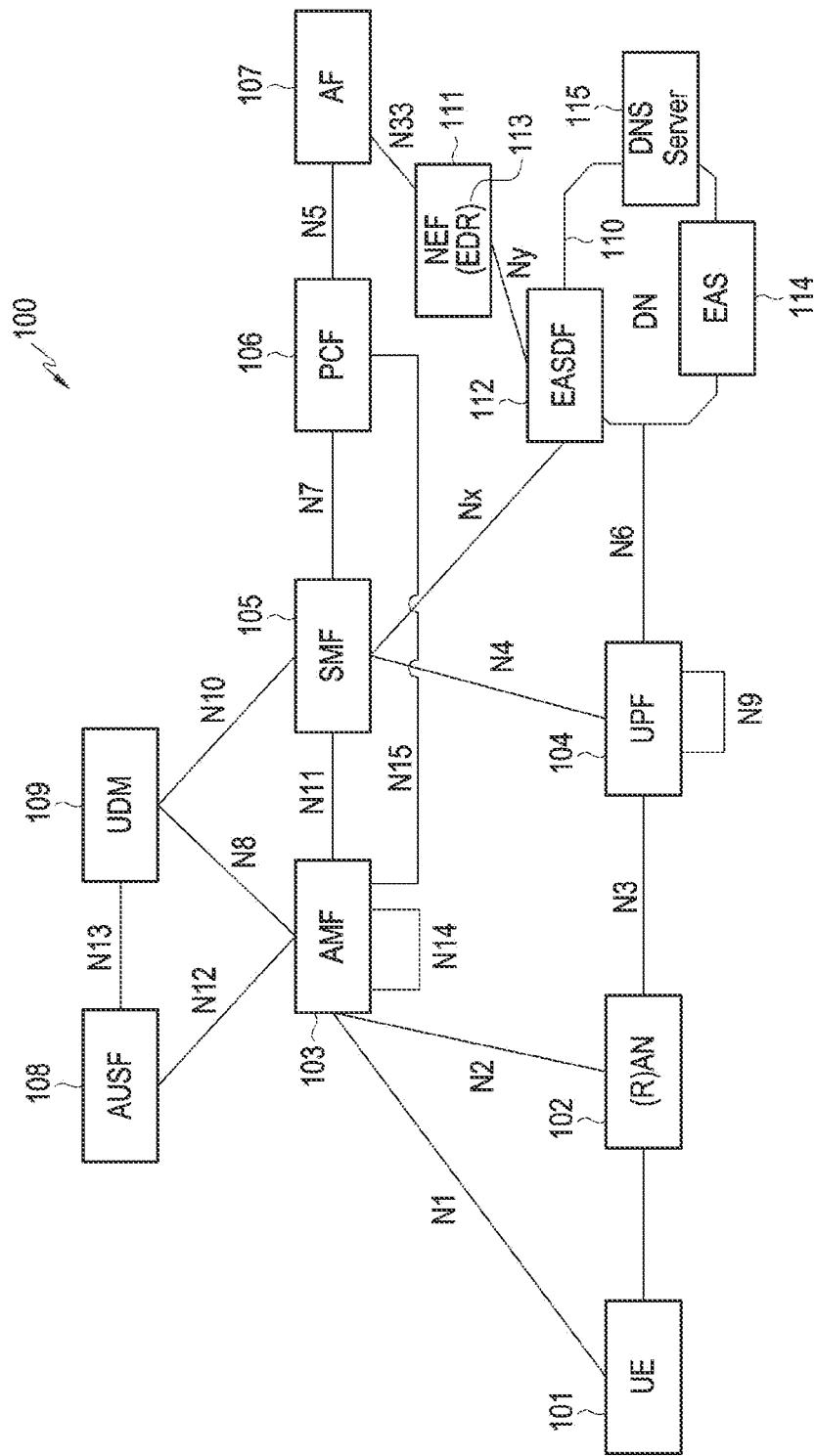
FIG. 1 is a view illustrating a network structure and interface of a 5G system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skilled in the art will recognize that various changes and modifications of the various embodiments described therein can be made without departing from the scope and spirit of the disclosure. In addition, descriptions of well-known functions and constructions may be omitted for clarity and conciseness The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, the base station may be an entity allocating resource to terminal and may be at least one of eNodeB, Node B, base station (BS), radio access network (RAN), access network (AN), RAN node, wireless access unit, base station controller, or node over network. The terminal may include UE (user equipment), MS (mobile station), cellular phone, smartphone, computer, or multimedia system capable of performing communication functions. According to the disclosure, downlink (DL) refers to a wireless transmission path of signal transmitted from the base station to the terminal, and uplink (UL) refers to a wireless transmission path of signal transmitted from the terminal to the base station. Further, although LTE or LTE-A system is described in connection with embodiments of the disclosure, as an example, embodiments of the disclosure may also apply to other communication systems with similar technical background or channel form. For example, 5G mobile communication technology (5G, new radio (NR)) developed after LTE-A may be included in systems to which embodiments of the disclosure are applicable, and 5G below may be a concept including legacy LTE, LTE-A and other similar services. Further, embodiments of the disclosure may be modified in such a range as not to significantly depart from the scope of the disclosure under the determination by one of ordinary skill in the art and such modifications may be applicable to other communication systems. It should be appreciated that the blocks in each flowchart and combinations of the flowcharts may be performed by computer program instructions.

Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions. As used herein, the term "unit" means a software element or a hardware element such as a field-programmable gate array (FPGA) or an application specific integrated circuit (ASIC). A unit may play a certain role. However, the term 'unit' is not limited as meaning a software or hardware element. A 'unit' may be configured in a storage medium that may be addressed or may be configured to reproduce one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a 'unit' may be combined with additional elements or may be split into sub elements or sub units. Further, an element or a 'unit' may be implemented to reproduce one or more CPUs in a device or a security multimedia card. According to embodiments, a " . . . unit" may include one or more processors.

FIG. 1 is a view illustrating a network structure and interface of a 5G system according to an embodiment of the disclosure. The network entity included in the network structure of the 5G system of FIG. 1 may include a network function (NF) according to system implementation.

Referring to FIG. 1, the network structure of the 5G system 100 may include various network entities. As an example, the 5G system 100 may include an authentication server function (AUSF) 108, an (core) access and mobility management function (AMF) 103, a session management function (SMF) 105, a policy control function (PCF) 106, an application function (AF) 107, a unified data management (UDM) 109, a data network (DN) 110, a network exposure function (NEF) 111, an edge application service domain repository (EDR) 113, an edge application server (EAS) 114, an EAS discovery function (EASDF) 112, a DNS server 115, a user plane function (UPF) 104, a (radio) access network ((R)AN) 102, and a UE, i.e., the user equipment (UE) 101.

Each NF of the 5G system 100 supports the following functions.

The AUSF 108 processes and stores data for authenticating the UE 101.

The AMF 103 provides functions for per-UE access and mobility management and may connect basically to one AMF per UE. Specifically, the AMF 103 supports such functions as inter-CN node signaling for mobility between 3GPP access networks, radio access network (RAN) CP interface (i.e., N2 interface) termination, NAS signaling termination (N1), NAS signaling security (NAS ciphering) and integrity protection, AS security control, registration management (registration area management), connectivity management, idle mode UE reachability (including controlling and performing paging retransmission), mobility management control (subscription and policy), intra-system mobility and inter-system mobility support, support of network slicing, SMF selection, lawful intercept (for interface to AMF event and LI system), transfer of session management (SM) messages between UE and SMF, transparent proxy for SM message routing, access authentication, access authorization including a roaming authority check, transfer of SMS messages between UE and SMF, security anchor function (SEA), and security context management (SCM). All or some of the functions of the AMF 103 may be supported in a single instance of one AMF.

The DN 110 means, e.g., an operator service, Internet access, or a third party service. The DN 110 transmits a downlink protocol data unit (PDU) to the UPF 104 or receives a PDU transmitted from UE 101 from UPF 104.

The PCF 106 receives information about packet flow from application server and provides the function of determining the policy such as mobility management or session management. Specifically, the PCF 106 supports functions such as support of a signalized policy framework for controlling network operations, providing a policy rule to allow CP function(s) (e.g., AMF or SMF) to execute a policy rule, and implementation of a front end for accessing subscription information related to policy decision in the user data repository (UDR).

The SMF 105 provides session management function and, if UE has multiple sessions, this may be managed per session by a different SMF. Specifically, the SMF 105 supports such functions as session management (e.g., session establishment, modification, and release including maintaining tunnel between the UPF 104 and the (R)AN 102 node), UE IP address allocation and management (optionally including authentication), selection and control of a UP function, traffic steering settings for routing traffic to a proper destination in UPF 104, interface termination towards policy control functions, execution of control part of policy and QoS, lawful intercept (for interface to SM event and LI system), termination of SM part of NAS message, downlink data notification, AN-specific SM information publisher (transferred via the AMF 103 and N2 to the (R)AN 102), SSC mode decision of session, and roaming function. All or some of the functions of the SMF 105 may be supported in a single instance of one SMF.

The UDM 109 stores, e.g., user's subscription data, policy data. The UDM 109 includes two parts, i.e., application front end (FE) (not shown) and user data repository (UDR) (not shown).

FE includes UDM FE in charge of location management, subscription management, and credential processing, and PCF in charge of policy control. The UDR stores data required for the functions provided by UDM-FE and the policy profile required by PCF. Data stored in UDR includes policy data and user subscription data including session-related subscription data and access and mobility-related subscription data, security credential, and subscription identity. The UDM-FE accesses the subscription information stored in UDR and supports such functions as authentication credential processing, user identification handling, access authentication, registration/mobility management, subscription management, and SMS management.

The UPF 104 transfers the downlink PDU, received from the DN 110, to the UE 101 via the (R)AN 102 and transfers the PDU, received from the UE 101 via the (R)AN 102, to the DN 110. Specifically, the UPF 104 supports such functions as anchor point for intra/inter RAT mobility, external PDU session point of interconnection to data network, packet routing and forwarding, packet inspection and user plane part of policy rule, lawful intercept, traffic usage reporting, uplink classifier for supporting routing of traffic flow to data network, branching point for supporting multi-home PDU session, QoS handling (e.g., packet filtering, gating, uplink/downlink rate execution) for user plane, uplink traffic verification (mapping between service data flow (SDF) and QoS flow), transport level packet marking in uplink and downlink, downlink packet buffering, and downlink data notification triggering. All or some of the functions of the UPF 104 may be supported in a single instance of one UPF.

The AF 107 interacts with 3GPP core network for providing services (e.g., supporting such functions as application influence on traffic routing, network capability exposure approach, and interactions with policy framework for policy control).

The (R)AN 102 collectively refers to new radio access technologies that support both E-UTRA (evolved E-UTRA) which is an evolution from 4G radio access technology and new radio access technology (NR: New Radio) (e.g., gNB).

gNB supports such functions as functions for radio resource management (i.e., radio bearer control, radio admission control, connection mobility control, dynamic allocation of resources (i.e., scheduling) to UE on uplink/downlink), internet protocol (IP) header compression, encryption and integrity protection of user data stream, where routing to AMF is not determined from information provided to UE, selection of an AMF when UE attaches, routing of user plane data to UPF(s), routing of control plane information to AMF, connection setup and release, scheduling and transmission (generated from AMF) of paging message, scheduling and transmission (generated from AMF or operating and maintenance (O&M)) of system broadcast information, measurement and measurement reporting configuration for mobility and scheduling, transport level packet marking on uplink, session management, support of network slicing, QoS flow management and mapping to data radio bearer, support of UE in inactive mode, distribution of NAS messages, NAS node selection, radio access network sharing, dual connectivity, and tight interworking between NR and E-UTRA.

UE 101 means a user device. The user device may be referred to as a terminal, mobile equipment (ME), or mobile station (MS). Further, the user device may be a portable device, such as a laptop computer, mobile phone, personal digital assistant (PDA), smartphone, or multimedia device or may be a non-portable device, e.g., a personal computer (PC) or vehicle-mounted device.

The NEF 111 provides a means to safely expose capabilities and services for, e.g., third party, internal exposure/re-exposure, application functions, and edge computing, provided by the 3GPP network functions. The NEF 111 receives information (based on exposed capability(ies) of other NF(s)) from other NF(s). The NEF 111 may store the received information as structured data using a standardized interface to the data storage network function. The stored information may be re-exposed to other NF(s) and AF(s) by NEF and be used for other purposes, e.g., analysis.

The EDR 113 is an NF that receives, from the AF 107, fully qualified domain name (FQDN), edge computing area name (ECAN), domain name system (DNS) server address, enhanced DNS client subnet (ECS) option information and is responsible for storing, managing, distributing, and provisioning it. The EDR 113 may exist as one service function in the NEF 111. Alternatively, the EDR 113 may exist as a separate NF, and the EDR 113 may coexist with other NFs, e.g., PCF 106, UDM 109, SMF 105, EASDF 112, or AF 107.

The EASDF 112 is an NF that may add an ECS option that may be expressed by the address of the DNS server to which the DNS request of the UE is to be forwarded and the IP subnet address to be added when forwarding the DNS request of the UE for each FQDN. The EASDF 112 receives EAS domain configuration information from the EDR 113 and processes the DNS request message received from the UE according to the received information. Further, the EASDF 112 is an NF that receives the UE IP address and position information within 3GPP of the UE, DNS message processing rules, and DNS message reporting rules from the SMF 105, processes the DNS query message received from the UE and the DNS response message received from the DNS server, and transmits, to the SMF 105, information in the DNS message and statistics information obtained by processing it, according to the DNS message reporting rule.

Figure 5:
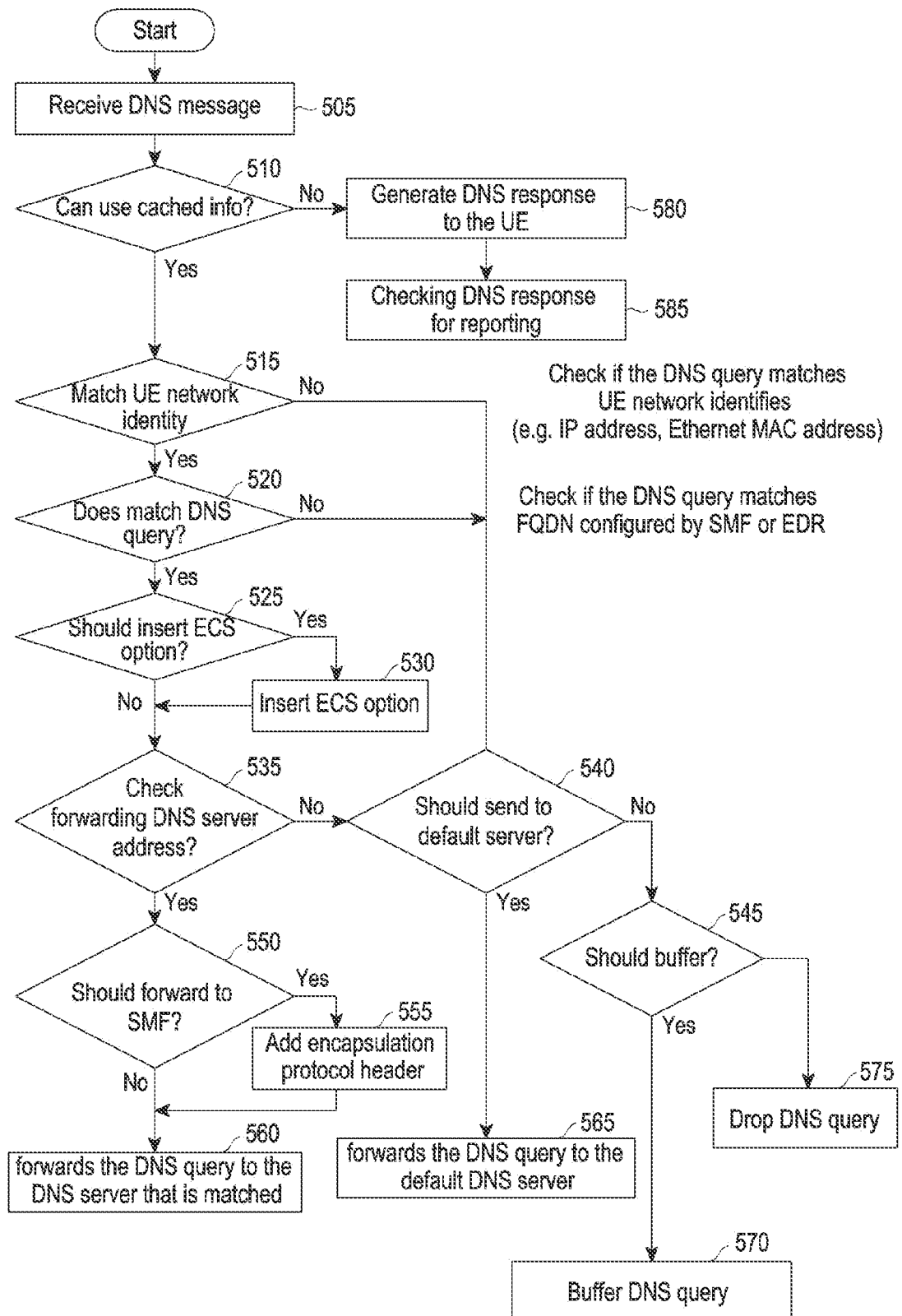
FIG. 5 is a view illustrating a procedure for processing a DNS query message by an EASDF according to an embodiment of the disclosure.

Referring to FIG. 1, the NF repository function (NRF) is not illustrated for clarity of description, but all of the NFs illustrated in FIG. 5 may interact with the NRF if necessary.

An NRF supports service discovery function. receives an NF discovery request from an NF instance and provides discovered NF instance information to the NF instance. further maintains available NF instances and their supporting services.

Meanwhile, although FIG. 1 illustrates an example reference model in which the UE 101 accesses one DN 110 using one PDU session for ease of description, the disclosure is not limited thereto.

The UE 101 may simultaneously access two data networks (i.e., local and central) using multiple PDU sessions. At this time, two SMFs may be selected for different PDU sessions. However, each SMF may have the capability of controlling both the local and central UPFs in the PDU session.

Further, the UE 101 may simultaneously access two (i.e., local and central) data networks provided in a single PDU session.

In 3GPP system, a conceptual link connecting between NFs in the 5G system is defined as a reference point. As an example, reference point(s) included in the system 100 of FIG. 1 are as follows.

N1: the reference point between the UE 101 and the AMF 103
N2: the reference point between N2, (R)AN 102, and AMF 103
N3: the reference point between N3, (R)AN 102 and UPF 104
N4: the reference point between the SMF 105 and the UPF 104
N5: the reference point between the PCF 106 and the AF 107
N6: the reference point between the UPF 104 and the DN 110
N7: the reference point between the SMF 105 and the PCF 106
N8: the reference point between the UDM 109 and the AMF 103
N9: the reference point between two core UPFs
N10: the reference point between the UDM 109 and the SMF 105
N11: the reference point between the AMF 103 and the SMF 105
N12: the reference point between the AMF 103 and the AUSF 108
N13: the reference point between the UDM 109 and the AUSF 108
N14: the reference point between two AMFs 103
N15: the reference point between PCF and AMF in non-roaming scenario and reference point between PCF in visited network and AMF in roaming scenario
Nx: the reference point between the SMF 105 and the EASDF 112
Ny: the reference point between the NEF (EDR) 111 and the EASDF 112

Figure 2:
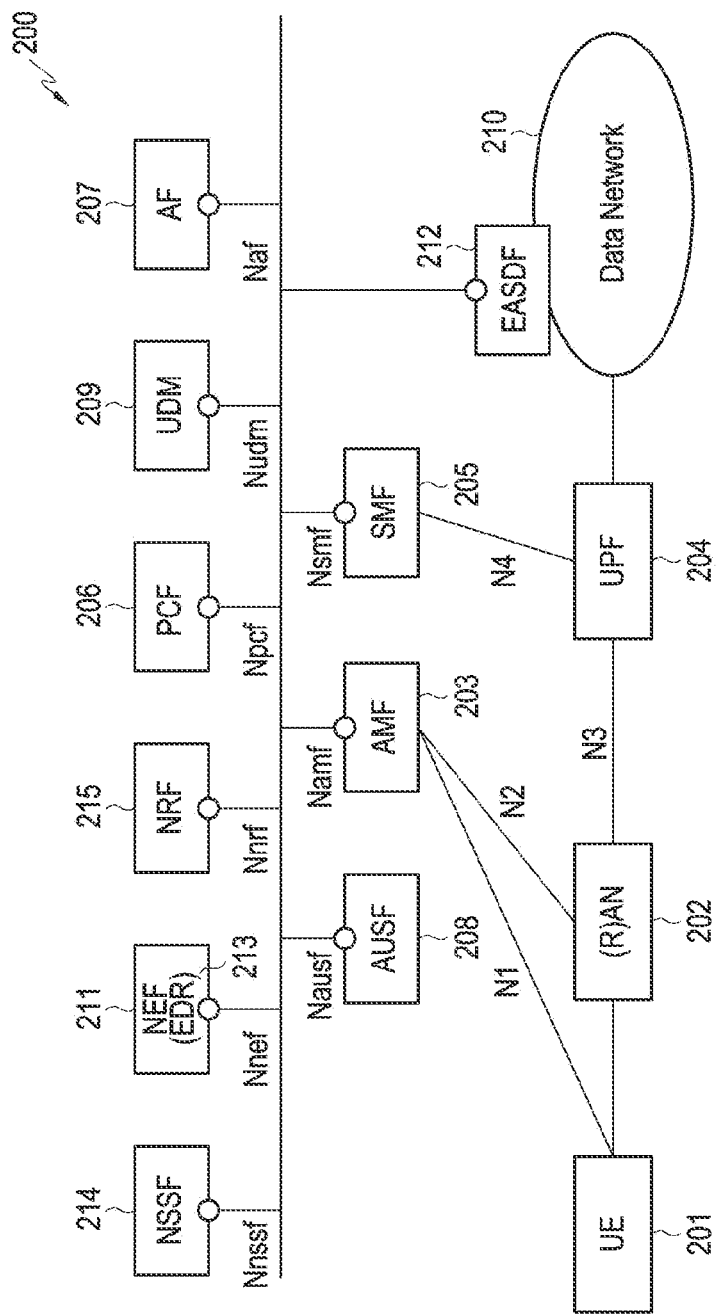
FIG. 2 is a view illustrating the network structure of the 5G system of FIG. 1 in a service-based format, according to an embodiment of the disclosure.

FIG. 2 is a view illustrating the network structure of the 5G system of FIG. 1 in a service-based format, according to an embodiment of the disclosure.

Referring to FIG. 2, the 5G system 200 may include a UE 201, a (R)AN 202, an AMF 203, a UPF 204, an SMF 205, a PCF 206, an AF 207, an AUSF 208, a UDM 209, a DN 210, a NEF 211, an EASDF 212, an EDR 213, a network slicing selection function (NSSF) 214, and an NRF 215.

The UE 201, (R)AN 202, AMF 203, UPF 204, SMF 205, PCF 206, AF 207, AUSF 208, UDM 209, DN 210, NEF 211, EASDF 212 and EDR 213 of FIG. 2 perform the same function as the UE 101, (R)AN 102, AMF 103, UPF 104, SMF 105), PCF 106, AF 107, AUSF 108, UDM 109, DN 110, NEF 111, EASDF 112 and EDR 113, respectively, of FIG. 1.

The NSSF 214 may select a set of network slice instances serving the UE 201. Further, the NSSF 214 may determine granted network slice selection assistance information (NS-SAI) and may perform mapping to subscribed single-network slice selection assistance information (S-NSSAI), if necessary. Further, the NSSF 214 may determine the configured NSSAI and may perform mapping to subscribed S-NSSAIs, if necessary. Further, the NSSF 214 may determine the AMF set used to serve the UE or query the NRF 215 according to the configuration to thereby determine a list of candidate AMFs.

The NRF 215 supports service discovery function. receives an NF discovery request from an NF instance and provides discovered NF instance information to the NF instance. further maintains available NF instances and their supporting services.

Various embodiments of the disclosure provide a method for managing a session according to movement of a UE in a cellular wireless communication system, e.g., a 5G system. Various embodiments of the disclosure are related to a method related to relocation of an application server accessed by a UE according to movement of the UE in edge computing.

In the conventional 3GPP 5G core network, relocation of the PDU session anchor-user plane function (PSA-UPF) does not take into account data path delay. In other words, in the conventional 3GPP 5G core network, the SMF used its own topology information to determine the relocation of the PSA-UPF. Various embodiments of the disclosure may provide a method for determining whether to relocate the PSA-UPF considering a delay in the data path by the 5G core network and the application program based on the request of the AF requiring a low-delay service.

According to various embodiments of the disclosure, the 5G core network and the application program determine the movement of the PSA-UPF considering the delay in the data path. If a handover occurs in which a UE receiving a service from one or more application programs leaves the service area in which the currently connected application program is placed, and a PSA-UPF movement is performed, service interruption may occur as the IP address of the UE is changed.

According to various embodiments of the disclosure, it may minimize service interruption by avoiding relocation of the PSA-UPF when the delay requested by the application program through the existing data path in the UE-moved area is met considering the delay requested by the application program.

According to various embodiments of the disclosure, it is possible to provide a service meeting the delay time requested by the application program by reconfiguring a path to a new PSA-UPF when the UE moves so that service is provided through the newly changed path or when the delay requested by the application program is not met.

First Embodiment

In the first embodiment of the disclosure, EDR may be introduced as a new NF that manages mapping for FQDN from the AF, data network access identifier (DNAI), and ECS option. A procedure is described in which the EDR transfers information to the EASDF via push or pull.

Figure 3A:
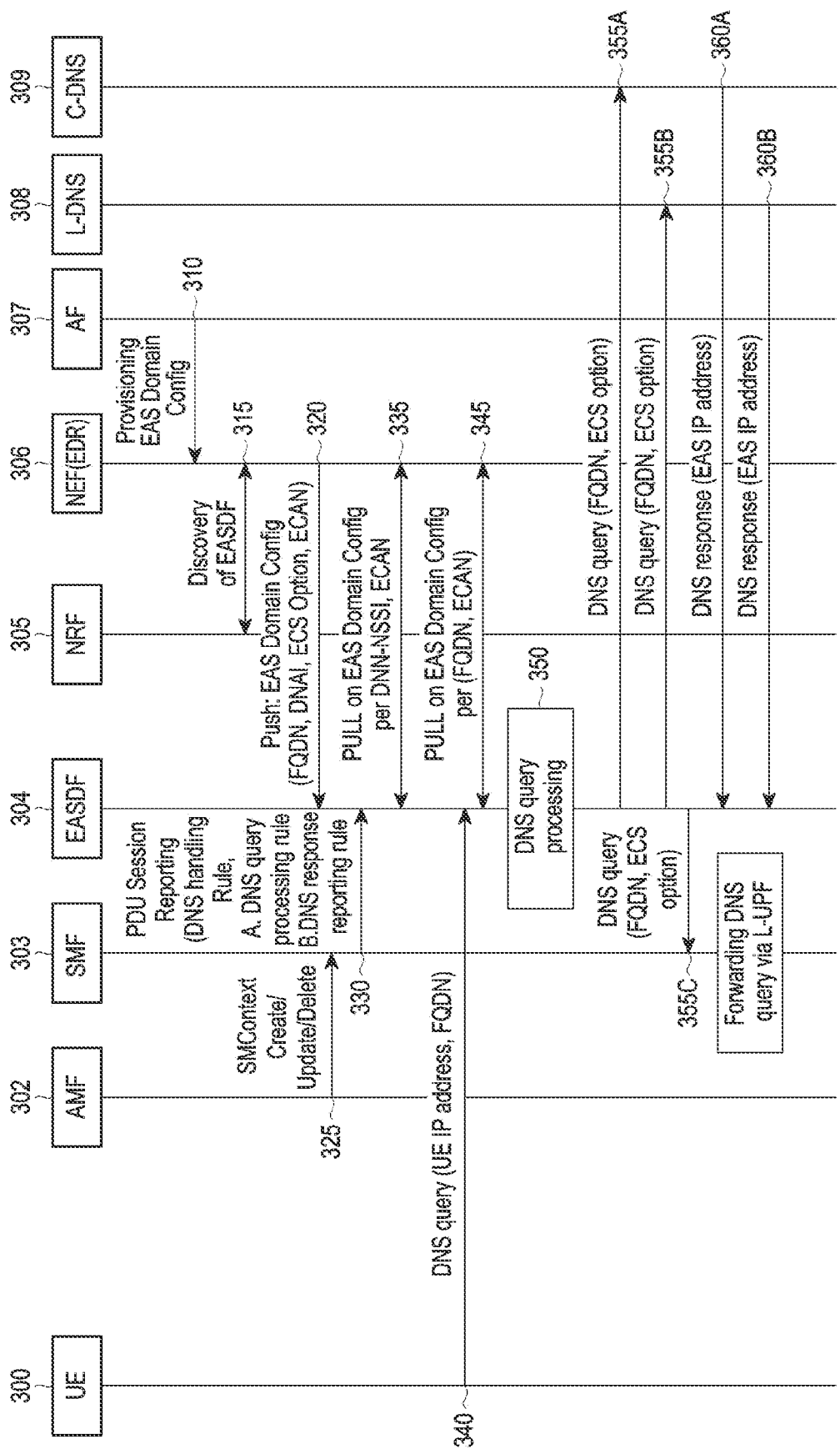
FIGS. 3A and 3B are views illustrating the operation of an EASDF using an EDR according to various embodiments of the disclosure.
Figure 3B:
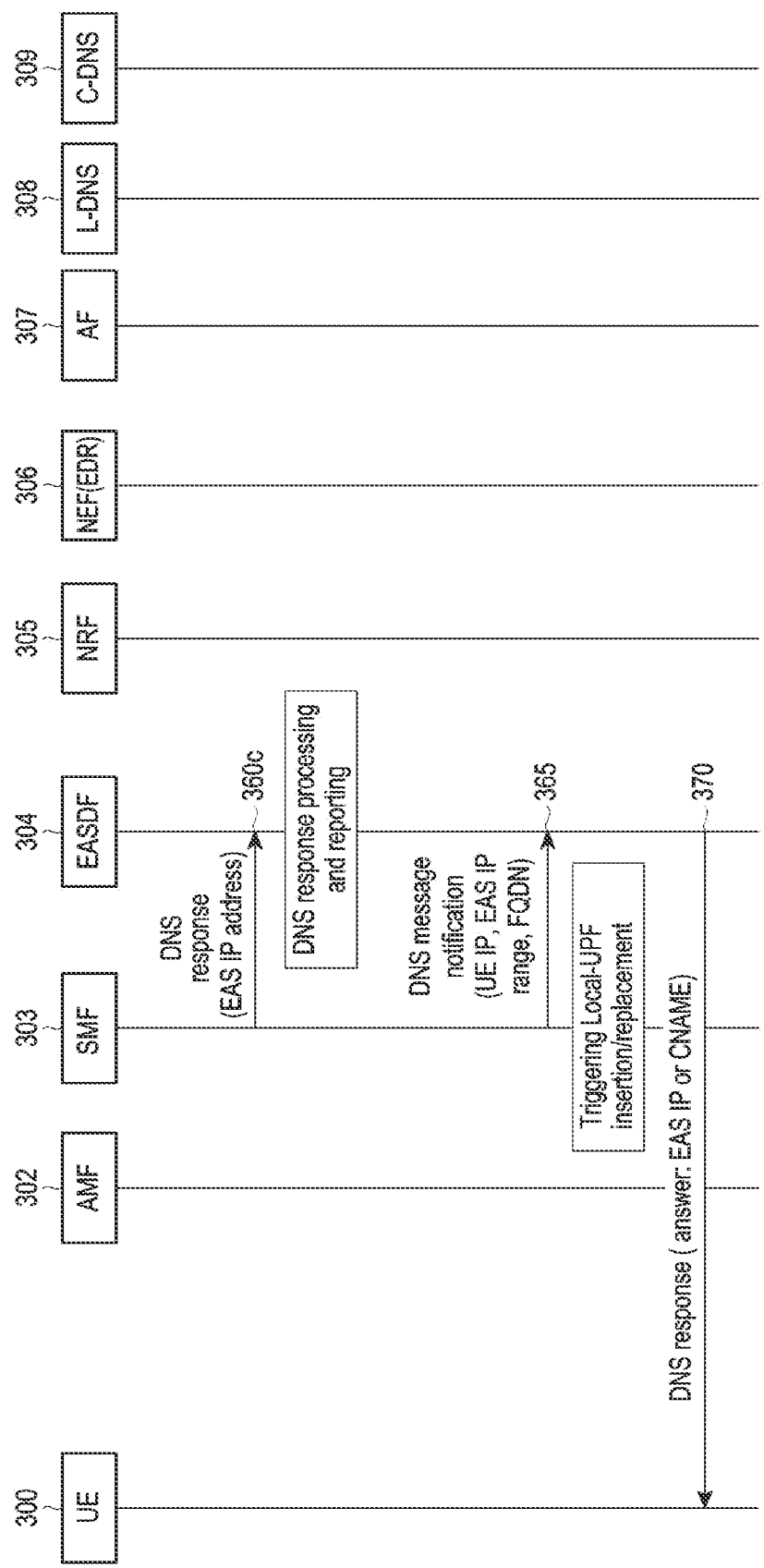

FIGS. 3A and 3B are views illustrating the operation of an EASDF using an EDR according to various embodiments of the disclosure. Although the EDR is illustrated as one service function of NEF in FIGS. 3A and 3B, it will be understood that the embodiment of the disclosure is applicable even when the EDR exists as a separate NF.

Referring to FIGS. 3A and 3B, in operation 310, the NEF (EDR) 306 processing EDR information receives EAS domain configuration information from the AF 307. The EAS domain configuration information received from the AF 307 may include at least one of the following information.

FQDN and FQDN expressed as a regular expression (e.g., www.eas1.com or *.eas1.com)
DNS server address
ECS option
DNAI
ECAN Meanwhile, the EAS domain configuration information may include at least one of multiple DNS server addresses, multiple ECS options, multiple DNAIs, or multiple ECAN information to simultaneously configure multiple edge computing areas for one FQDN.

The NEF (EDR) 306 stores EAS domain configuration information in the UDR.

In operation 315, the NEF (EDR) 306 sends a request for the address of the EASDF 304 to the NRF 305 to discover the EASDF 304 and receives the address of the EASDF 304 previously registered in the NRF 305.

In operation 320, the NEF (EDR) 306 transfers the EAS domain configuration information to the EASDF 304 in a push scheme. A more specific procedure for the NEF (EDR) 306 to transfer the EAS domain configuration information in the push scheme is described below in detail in connection with the second embodiment. The EAS domain configuration information may include a plurality of DNS server addresses, a plurality of ECS options, a plurality of DNAIs, and/or a plurality of ECANs for each FQDN.

In operation 325, when the PDU session of the UE 300 is created or the PDU session is changed or deleted by the movement of the UE 300, the SMF 303 receives, from the AMF 302, an SM context creation message, an SM context update message, or an SM context delete message.

In operation 330, when the SMF 303 receives the SM context creation message or the SM context update message from the AMF 302, the SMF 303 transmits, to the EASDF 304, a PDU session state report message including PDU session information and/or PDU session state information for the UE 300. The PDU session state report message transmitted by the SMF 303 to the EASDF 304 may include at least one of the following information.

UE 300 identifier, UE IP address, Ethernet medium access control (MAC) address of the UE 300, and/or subscription permanent identifier (SUPI) or generic public subscription identifier (GPSI) information about the UE 300
PDU session-related context information for each UE, UE IP address, PDU session identifier
Current position on the 3GPP access network of the UE 300 (e.g., tracking area (TA), cell ID, public land mobile network (PLMN) identifier, area of interest (AOI), presence reporting area (PRA))
ECAN to which UE 300 belongs
Name and slice information (data network name (DNN) and S-NSSAI) of the PDU session for the UE 300
DNAI list information (connected DNAI) that may be connected to a local PSA that may be accessed and added in the PDU session of the current UE 300 (connected DNAI)
DNAI list (candidate DNAIs) that are connectable by adding a local PSA-UPF in the current position of the UE 300 but are not presently connected.
per UE, DNS message processing rules (e.g., DNS query message processing rules, DNS response message processing rules, and/or DNS response message reporting rules),
ECAN corresponding to the current position of the UE 300
DNS message processing indicator utilizing EAS domain configuration information, DNS message processing indicator using EAS domain configuration information stored by EASDF 304 or EAS domain configuration information received from EDR In operation 335, the EASDF 304 creates a UE context in the EASDF 304 of the UE 300 when receiving the address and position information for the UE 300 from the SMF 303. The UE context in the EASDF 304 may include at least one of the following information.

ID information about the UE 300
PDU session-related information about the UE 300, DNN, S-NSSAI, PDU session identifier
IP address information about the UE 300
Location information within 3GPP of the UE 300 (e.g., TA, registration area (RA), cell identifier information about the cell where the UE is currently camping)
DNAI information associated with the local UPF connected in the current position of the UE 300
DNAI information associated with a local UPF connectable in the current position of the UE 300
DNS message processing indicator utilizing EAS domain configuration information When the PDU session state report message received from the SMF 303 includes the indicator using the EAS domain configuration information for DNS message processing, the EASDF 304 may send a request for EAS domain configuration information to the NEF (EDR) 306 and receive EAS domain configuration information. A specific procedure in which the EASDF 304 sends a request for EAS domain configuration information to the NEF (EDR) 306 when the PDU session state report message includes EAS domain configuration information is described below in detail in connection with the third embodiment.

EAS domain configuration information pre-configured in the EASDF 304 or received from the NEF (EDR) 306 may include at least one of the following information.

EAS identifier: FQDN
information for each edge computing service area
ECAN
associated DNAI
ECS option: IP subnetwork address (that is, information added to the DNS query message to inform the DNS server of the position of the UE 300)
An indicator as to whether to add an ECS option when the EASDF 304 processes the DNS query message received from the UE 300
DNS server address to be forwarded by EASDF 304
EAS IP address range accessible from the associated DNAI (which may be used for registration of routing rules of uplink classifier (ULCL))

edge computing service provider identifier (e.g., service provider ID and/or edge computing service provider ID)

edge computing subscriber group identifier (or subscriber group identifier);

A group identifier for providing edge computing services only to subscribers belonging to the subscriber group.

The SMF 303 identifies whether a subscriber belongs to a subscriber group from the UDM and then provides a pre-configured DNS response only to the corresponding subscriber.

Edge computing data network identifier: DNN/S-NS-SAI

In operation 340, the UE 300 executes an application program and transmits a DNS query message including FQDN for discovering EAS to the EASDF 304. The DNS query message may include the IP address of the UE. The IP address of the EASDF 304 may be included in the DNS server address field of the protocol configuration option (PCO) when the SMF 303 creates a PDU session for the UE 300 and transmitted to the UE 300.

In operation 345, if the EAS domain configuration information for the FQDN included in the DNS query message received from the UE 300 is not configured in the EASDF 304, or if operation 320 or 335 is not performed in advance, the EASDF 304 may send a request for EAS domain configuration information to the NEF (EDR) 306. A more specific procedure for the EASDF 304 to send a request for the EAS domain configuration information to the NEF (EDR) 306 is described below in detail in connection with the fourth embodiment.

In operation 350, the EASDF 304 receiving the DNS query message from the UE 300 processes the DNS query message of the UE 300 based on the PDU session state report message and EAS domain configuration information received from the SMF 303 in operation 330. A more detailed procedure for the EASDF 304 to process the DNS query message received from the UE 300 may refer to FIGS. 4 and 5 to be described below.

In operation 355A, if the DNS server address set in the EASDF 304 is set as the central DNS (C-DNS) server address, the EASDF 304 sends a DNS query message to the C-DNS server 309. The C-DNS server 309 performs DNS resolution on the FQDN included in the DNS query message. To this end, the C-DNS server 309 may repeatedly transmit a DNS query message to a plurality of other DNS server(s) and receive a response thereto. In this case, the plurality of other servers may identify the ECS option transferred by the EASDF 304 so as to identify which edge computing area the UE 300 is in. Through this, the C-DNS server 309 identifies the IP address of the EAS for the FQDN requested by the UE 300.

In operation 355B, when the set DNS server address is the address of the local DNS (L-DNS) server 308, the EASDF 304 transfers a DNS query message to the L-DNS server 308 in the same manner as operation 355A. The L-DNS server 308 may identify the EAS IP address in the same manner as the above-described C-DNS server 309 does.

In operation 355C, when the set DNS server address is transferred via the SMF 303, the EASDF 304 transfers a DNS query message to the SMF 303. Upon receiving the DNS query message, the SMF 303 performs routing to send the DNS query message through preset information to the destination address. The DNS query message is forwarded to a UPF (e.g., L-UPF) appropriate for transmission to the DNS server, and the DNS query message is transmitted to the DNS server through the appropriate UPF. The DNS server identifies the EAS IP address of the DNS query message requested by the UE in the same manner as the above-described C-DNS server 309 does.

In operation 360A, the C-DNS server 309, which receives the DNS query message from the EASDF 304 through operation 355A, transmits, to the EASDF 304, a DNS response message including the IP address of the EAS identified in operation 355A. The DNS response message may include a DNS header and a DNS answer section. The DNS header may include a differentiator for differentiating whether it is a query or a response and indicator(s) indicating whether it is an authoritative answer (AA). The DNS answer section may include a plurality of resource records. The resource record may include at least one of a domain name, the type and/or class of the resource class, the time-to live (TTL) of the resource record, or the content, i.e., IP address, of the resource record.

In operation 360B, the L-DNS server 308, which receives the DNS query message from the EASDF 304 through operation 355B, transmits, to the EASDF 304, a DNS response message including the IP address of the EAS identified in operation 355B.

In operation 360C, the DNS server, which receives the DNS query message from the EASDF 304 via the SMF 303 through operation 355C, replies with a DNS response message including the IP address of the EAS identified in operation 355C. As an example, the DNS response message transmitted from the DNS server is transferred to the SMF 303 through an appropriate UPF. The SMF 303 forwards the DNS response message to the EASDF 304.

The DNS response message received by the EASDF 304 in operation 360A, 360B, or 360C may include the FQDN requested by the UE 300 and the EAS IP address corresponding thereto. The EASDF 304, receiving the DNS response message, may identify a DNS message processing rule, previously set through the SMF 303, e.g., the DNS message processing rule contained in the PDU session state report message received in operation 330. The EASDF 304 may determine whether the DNS response message meets a condition for processing the DNS response message through the DNS response message processing rule contained in the DNS message processing rule. The EASDF 304 may determine whether the DNS response message meets a condition for reporting the DNS response message through the DNS response message reporting rule contained in the DNS message processing rule.

In operation 365, when the DNS response message meets the condition for reporting the DNS response message, contained in the DNS response message reporting rule, the EASDF 304 may generate a DNS report message and transfer the generated DNS report message to the SMF 303. The DNS report message may include at least one of the UE IP address, FQDN (requested by the UE 300), or the EAS IP address (for the FQDN requested by the UE 300). A specific procedure for the EASDF 304 to transfer the DNS report message to the SMF 303 is disclosed with reference to FIG. 10.

The SMF 303 may trigger the adding, deleting, or changing of the local UPF based on at least one of the information contained in the DNS report message received from the EASDF 304, information set in the SMF 303, or subscription information or operator's policy information set from the PCF 106 or 206 or another NF in 5GC.

In operation 370, the EASDF 304 transmits, to the UE 300, the DNS response message containing the EAS IP address for the FQDN requested by the UE 300.

Figure 4:
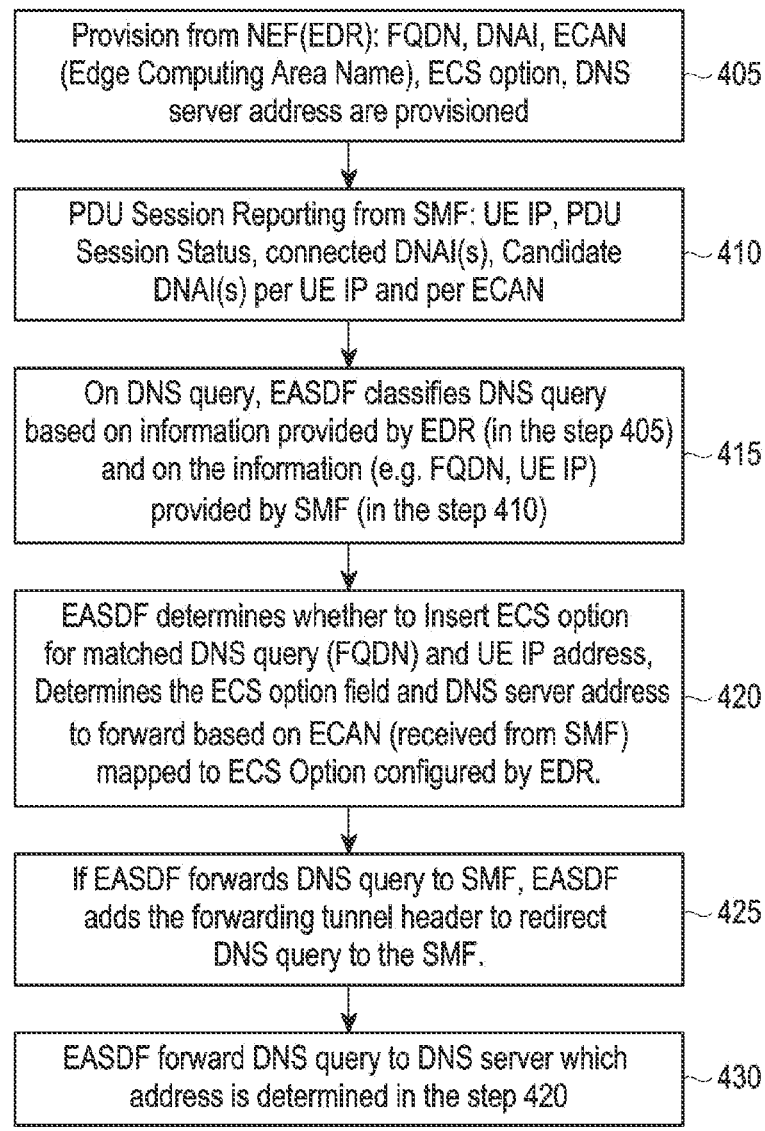
FIG. 4 is a view illustrating a procedure for processing a DNS query message by an EASDF according to an embodiment of the disclosure.

FIG. 4 is a view illustrating a procedure for processing a DNS query message by an EASDF according to an embodiment of the disclosure.

Referring to FIG. 4, in operation 405, the EASDF receives, via push, EAS domain configuration information from the NEF (EDR) processing EDR information. The EAS domain configuration information may include a plurality of DNS server addresses, ECS options, DNAIs, and/or ECAN information for each FQDN.

In operation 410, the EASDF receives a PDU session state report message for the UE from the SMF. The PDU session state report message may include the UE IP address, ECAN, PDU session state information, and/or DNS message processing rule.

In operation 415, the EASDF receives the DNS query message from the UE and classifies the DNS query message based on the EAS domain configuration information received in operation 405 and information contained in the PDU session report message received in operation 410. As an example, the EASDF determines whether the DNS query message complies with the FQDN contained in the EAS domain configuration information received in operation 405 and the DNS message processing rule and UE identifier (e.g., UE IP address) contained in the PDU session report message received in operation 410.

In operation 420, the EASDF determines whether to add an ECS option to the DNS query message complying with the FQDN contained in the EAS domain configuration information received in operation 405 and the DNS message processing rule and UE identifier (e.g., UE IP address) contained in the PDU session report message received in operation 410 and determines the DNS server address to be forwarded. As an example, the EASDF determines the DNS server address to be forwarded based on the ECAN contained in the PDU session report message received in operation 410 complying with the ECS option contained in the EAS domain configuration information received in operation 405, whether to add an ECS option field and, if added, the value of the ECS option field to be added.

In operation 425, the EASDF adds, to the DNS query message, a forwarding tunnel header for redirecting the DNS query message to the SMF when forwarding the DNS query message to the SMF.

In operation 430, the EASDF forwards the DNS query message to the address of the DNS server determined in operation 420.

FIG. 5 is a view illustrating a procedure for processing a DNS query message by an EASDF according to an embodiment of the disclosure.

Referring to FIG. 5, in operation 505, the EASDF receives a DNS query message from the UE.

In operation 510, when the EASDF receives the PDU session state report message for the UE from the SMF, the EASDF identifies the UE identifier (e.g., UE IP address, Ethernet MAC address of the UE, and/or the SUPI or GPSI of the UE) contained in the PDU session state report message and identifies the UE context configured in the EASDF. The UE context may include information about the DNAI currently connected in the current position of the UE and information about the DNAI connectable. Upon identifying the UE identifier and UE context contained in the PDU session state report message, the EASDF performs operation 515 and operation 580.

In operation 515, the EASDF determines whether the UE IP address contained in the DNS query message received from the UE matches the UE IP address contained in the PDU session state report message received from the SMF. When the UE IP address contained in the DNS query message matches the UE IP address contained in the PDU session state report message, the EASDF performs operation 520. When the UE IP address contained in the DNS query message does not match the UE IP address contained in the PDU session state report message, the EASDF performs operation 540.

In operation 520, the EASDF identifies whether the FQDN contained in the DNS query message received from the UE and the FQDN matching the FQDN expressed in regular expression are associated with the EAS domain configuration information. As an example, the EASDF identifies whether the UE's DNAI obtained in operation 510 and/or the DNS message processing information corresponding to the ECAN is contained in the EAS domain configuration information. When the FQDN matching the FQDN expressed in regular expression and the FQDN contained in the DNS query message are associated with the EAS domain configuration information, the EASDF performs operation 525. When the FQDN matching the FQDN expressed in regular expression and the FQDN contained in the DNS query message are not associated with the EAS domain configuration information, the EASDF performs operation 540.

Although FIG. 5 illustrates that operation 520 is performed after operation 515, it may be appreciated that the embodiment of FIG. 5 may perform operation 515 after operation 520 or simultaneously perform operations 515 and 520.

In operation 525, the EASDF determines whether to add an ECS option to the DNS query message. As an example, the EASDF identifies whether the EAS domain configuration information includes an ECS option or an ECS option add indicator. When the EAS domain configuration information includes an ECS option or an ECS option add indicator, the EASDF performs operation 530. When the AS domain configuration information does not include an ECS option or an ECS option add indicator, the EASDF performs operation 535.

In operation 530, the EASDF may add an ECS option, which corresponds to the FQDN and the edge computing-related position (e.g., DNAI and/or ECAN) of the current UE, to the DNS query message. After adding the ECS option to the DNS query message, the EASDF performs operation 535.

In operation 535, the EASDF identifies whether the EAS domain configuration information includes the DNS server address matching the received DNS query message so as to configure a DNS server to forward the DNS query message. When the EAS domain configuration information includes the DNS server address matching the received DNS query message, the EASDF sets the DNS server address to forward the DNS query message as the DNS server address matching the DNS query message and performs operation 550. When the EAS domain configuration information does not include the DNS server address matching the received DNS query message, the EASDF performs operation 540.

In operation 550, the EASDF determines whether to forward the DNS query message to the SMF. As an example, the EASDF identifies whether the EAS domain configuration information includes an indicator indicating whether to forward the DNS query message to the SMF. When the DNS query message needs to be forwarded to the SMF, i.e., when the EAS domain configuration information includes an indicator indicating whether to forward the DNS query message to the SMF, the EASDF performs operation 555. When the DNS query message is not forwarded to the SMF, i.e., when the EAS domain configuration information does not include an indicator indicating whether to forward the DNS query message to the SMF, the EASDF performs operation 560.

In operation 555, the EASDF adds an encapsulation protocol header to the DNS query message to forward the DNS query message to the SMF and forwards the received DNS query message to the SMF.

In operation 560, the EASDF forwards the received DNS query message to the set DNS server address.

When the EAS domain configuration information does not include the DNS server address matching the received DNS query message, the EASDF identifies whether there is a default DNS server in operation 540. When there is a default DNS server, the EASDF performs operation 565. When there is no default DNS server, the EASDF performs operation 545.

In operation 565, the EASDF forwards the DNS query message to the default DNS server.

In operation 545, the EASDF identifies whether the EAS domain configuration information includes an indicator indicating whether the rule matching the DNS query message needs to buffer the DNS query message. When the EAS domain configuration information includes an indicator indicating whether the rule matching the DNS query message needs to buffer the DNS query message, the EASDF performs operation 570. When the EAS domain configuration information does not include an indicator indicating whether the rule matching the DNS query message needs to buffer the DNS query message, the EASDF performs operation 575.

In operation 570, the EASDF buffers the DNS query message.

In operation 575, the EASDF may discard the DNS query message.

In operation 580, the EASDF generates a DNS response message for the UE. After generating the DNS response message for the UE, the EASDF performs operation 585.

In operation 585, the EASDF determines whether the DNS response message generated in operation 580 meets the reporting condition through the DNS response message reporting rule contained in the PDU session state report message.

Second Embodiment

An external edge computing operator transmits EAS domain configuration information to the EDR through the AF, thereby providing the EAS domain configuration information to the 5G core network.

In the second embodiment, a procedure for transferring the EAS domain configuration information received from the AF to the EASDF via push by the EDR is described.

Figure 6:
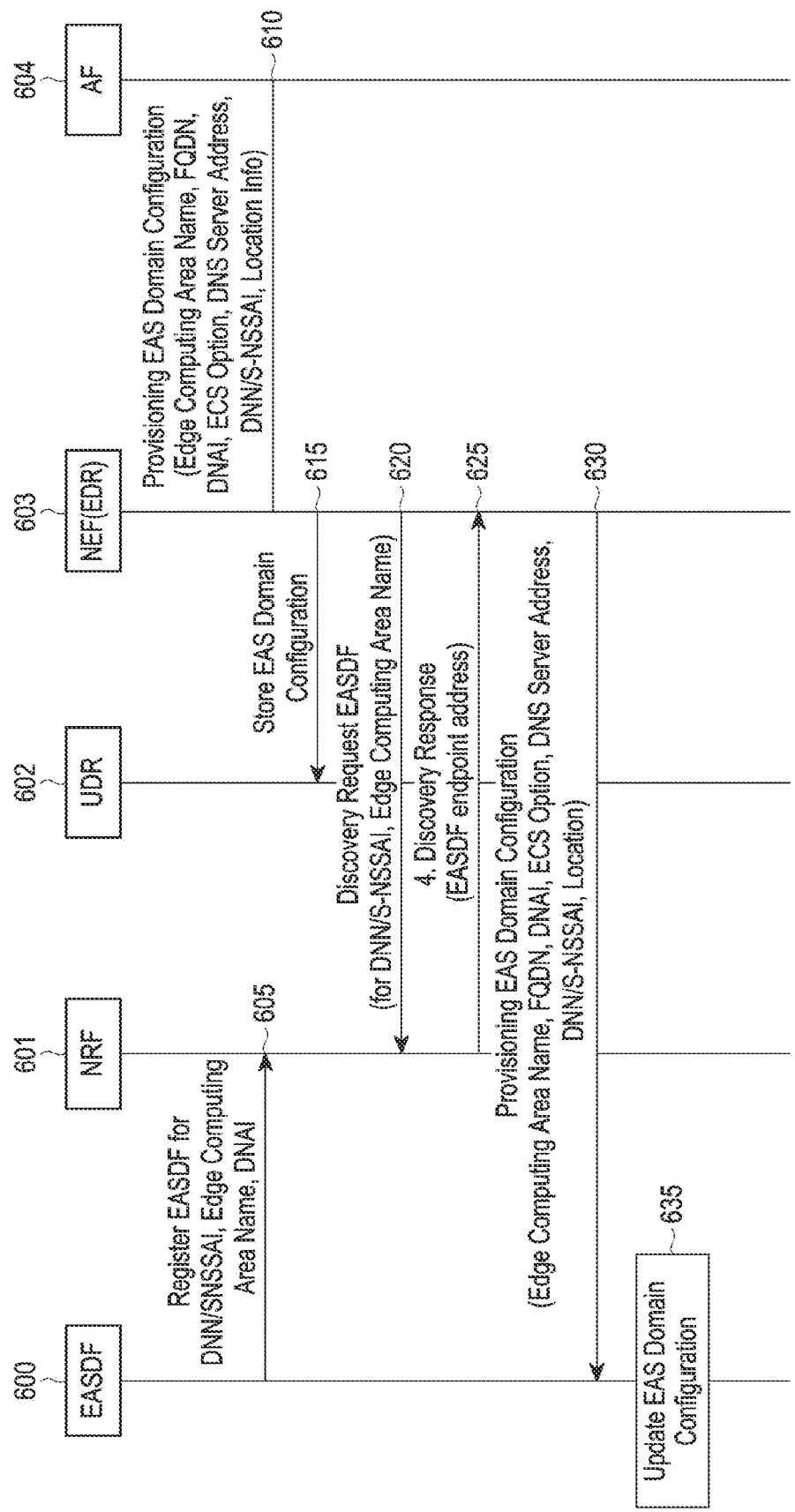
FIG. 6 is a view illustrating a procedure for transferring EAS domain configuration information to an EASDF in a push scheme according to an embodiment of the disclosure.

FIG. 6 is a view illustrating a procedure for transferring EAS domain configuration information to an EASDF in a push scheme according to an embodiment of the disclosure. Although the EDR is illustrated as one service function of NEF in FIG. 6, it will be understood that the embodiment of FIG. 6 is applicable even when the EDR exists as a separate NF.

Referring to FIG. 6, in operation 605, an EASDF 600 transmits a registration request message to an NRF 601 to register the endpoint address of the EASDF 600 in the NRF 601. The endpoint address of the EASDF 600 may include at least one of an IP address, a domain address expressed as FQDN, or uniform resource locator (URL) to provide NF service. The registration request message transmitted from the EASDF 600 to the NRF 601 may include at least one of information about the DNS/S-NSSAI provided by the EASDF 600, information (e.g., ECAN) indicating the edge computing area, or DNAI.

In operation 610, the AF 604 transmits EAS domain configuration information to the NEF (EDR) 603 processing EDR information. The EAS domain configuration information may include at least one of the following information.
EAS identifier: FQDN
information for each edge computing service area
  ECAN
  associated DNAI
  ECS option: IP subnetwork address (that is, information added to the DNS query message to inform the DNS server of the position of the UE)
  An indicator as to whether to add an ECS option when the EASDF processes the DNS query message received from the UE
  DNS server address to be forwarded by EASDF
  EAS IP address range accessible from the associated DNAI (which may be used for registration of routing rules of ULCL)
edge computing service provider identifier (e.g., service provider ID or edge computing service provider ID)
edge computing subscriber group identifier (or subscriber group identifier);
  A group identifier for providing edge computing services only to subscribers belonging to the subscriber group.
  The SMF identifies whether a subscriber belongs to a subscriber group from the UDM and then provides a pre-configured DNS response only to the corresponding subscriber.
  Edge computing data network identifier: DNN/S-NSSAI In operation 615, the NEF (EDR) 603 stores the EAS domain configuration information in the UDR 602.

In operation 620, the NEF (EDR) 603 transmits, to the NRF 601, a discovery request message for the EASDF 600 being served in the edge computing area (e.g., ECAN) and/or the DNN/S-NSSAI contained in the EAS domain configuration information.

In operation 625, the NRF 601 transmits, to the NEF (EDR) 603, a response message for the discovery request message in operation 620. The response message transmitted from the NRF 601 to the NEF (EDR) 603 may include the endpoint address of the EASDF 600.

In operation 630, the NEF (EDR) 603 transmits, to the EASDF 600, an EAS domain configuration request message based on the preset endpoint address of the EASDF 600 or the endpoint address of the EASDF 600 obtained in operation 625. The EAS domain configuration request message may include EAS domain configuration information.

In operation 635, the EASDF 600 may add the EAS domain configuration information received in operation 625 or update the EAS domain configuration information previously and locally configured in the EASDF 600 based on the EAS domain configuration information received in operation 625.

Third Embodiment

The third embodiment of the disclosure concerns a procedure for an EASDF to request EAS domain configuration information when a session of a UE is generated or when the UE moves. As an example, the third embodiment of the disclosure discloses a procedure in which the EASDF requests EAS domain configuration information when the SMF notifies the EASDF that the UE's PDU session information is generated or changed.

Figure 7:
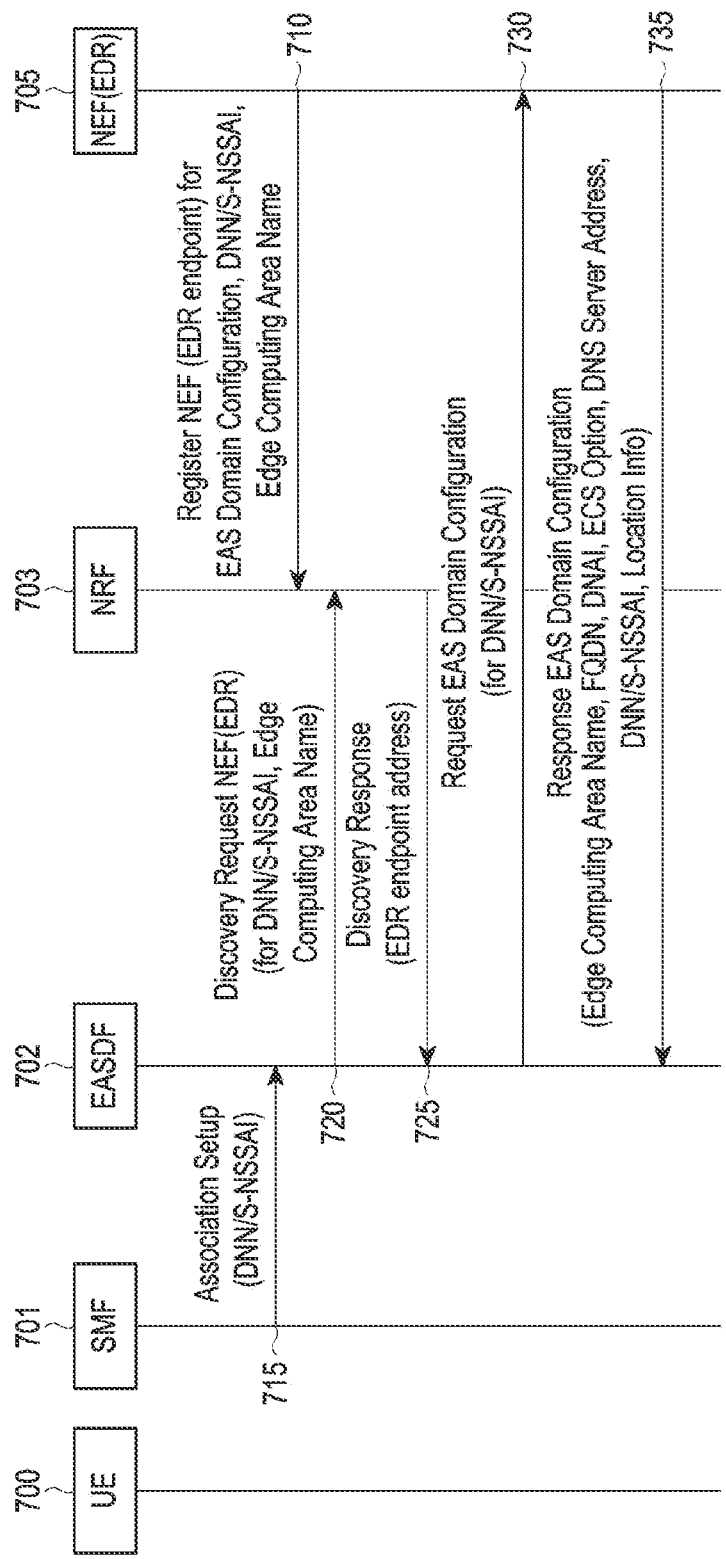
FIG. 7 is a view illustrating a procedure for requesting EAS domain configuration information by an EASDF according to an embodiment of the disclosure.

FIG. 7 is a view illustrating a procedure for requesting EAS domain configuration information by an EASDF according to an embodiment of the disclosure. Although the EDR is illustrated as one service function of NEF in FIG. 7, it will be understood that the embodiment of FIG. 7 is applicable even when the EDR exists as a separate NF.

Referring to FIG. 7, in operation 710, an NEF (EDR) 705, which processes EDR information, transmits, to an NRF 703, a registration request message for registering that the NEF (EDR) 705 is managing EAS domain configuration information. The registration request message transmitted from the NEF (EDR) 705 to the NRF 703 may include at least one of the following information.
- Endpoint address of NEF (EDR) 705
- Differentiator for differentiating EAS domain configuration information
- Network and slice identifier, DNN/S-NSSAI, to provide EAS domain configuration information
- Name, ECAN and/or DNAI, of the data center providing EAS domain configuration information In operation 715, when the UE's PDU session is generated or changed, or when the UE moves, the SMF 701 transmits an association setup message to the EASDF 702. The association setup message transmitted from the SMF 701 to the EASDF 702 may include at least one of the following information.
- Information for identifying the data network and slice of UE 700 (e.g., DNN/S-NSSAI)
- Information for identifying UE 700 (e.g., the network address of UE 700, IPv4 address, IPv6 prefix/address, Ethernet MAC address, and/or identifier (SUPI and/or GPSI) of UE 700)
- List of DNAIs already connected with UE 700 through local UPF
- List of DNAIs connectable with UE 700 through local UPF In operation 720, the EASDF 702 discovers the address of the NEF (EDR) 705 based on information obtained through the NRF 703 or preset information. As an example, the EASDF 702 transmits a discovery request message for the NEF (EDR) 705 to the NRF 703 to discover the NEF (EDR) 705. The discovery request message transmitted from the EASDF 702 to the NRF 703 may include information about ECAN and/or DNN/S-NSSAI for discovery for the NEF (EDR) 705.

In operation 725, the NRF 703 discovers the NEF (EDR) 705 storing EAS domain configuration information through information registered in operation 710. The NRF 703 transmits, to the EASDF 702, a response message including information about the endpoint address of the NEF (EDR) 705 requested for discovery by the EASDF 702, as a response to the discovery request message in operation 720.

In operation 730, the EASDF 702 transmits a request message for EAS domain configuration information to the NEF (EDR) 705. The request message for the EAS domain configuration information may include at least one of the following information.
- Information for identifying the data network and slice of UE 700 (e.g., DNN/S-NSSAI)
- Information for identifying UE 700 (e.g., the network address, IPv4 address, IPv6 prefix/address, Ethernet MAC address, or identifier (SUPI and/or GPSI) of UE 700)
- Position, on 3GPP network topology, of UE 700 (e.g., TA, RA, AOI, LADN DNN, cell list)
- Local network identifier and/or identifier list, DNAI, for connection in the position of UE 700 on the 3GPP network
- FQDN list managed by the local DNS server to which the UE may connect via local UPF, FQDN list, and/or FQDNs expressed in regular expression In operation 735, the NEF (EDR) 705 transmits, to the EASDF 702, a response message including EAS domain configuration information, as a response to the request message in operation 730. The EAS domain configuration information may include at least one of the following information.
- EAS identifier: FQDN
- information for each edge computing service area
  - ECAN
  - associated DNAI
  - ECS option: IP subnetwork address (that is, information added to the DNS query message to inform the DNS server of the position of the UE)
  - An indicator as to whether to add an ECS option when the EASDF processes the DNS query message received from the UE
  - DNS server address to be forwarded by EASDF
  - EAS IP address range accessible from the associated DNAI (which may be used for registration of routing rules of ULCL)
- edge computing service provider identifier (e.g., service provider ID or edge computing service provider ID)
- edge computing subscriber group identifier (or subscriber group identifier);
  - A group identifier for providing edge computing services only to subscribers belonging to the subscriber group.
  - The SMF identifies whether a subscriber belongs to a subscriber group from the UDM and then provides a pre-configured DNS response only to the corresponding subscriber.
- Edge computing data network identifier: DNN/S-NSSAI Fourth Embodiment The fourth embodiment of the disclosure concerns a procedure in which an EASDF requests EAS domain configuration information when receiving a DNS query message from a UE.

Figure 8:
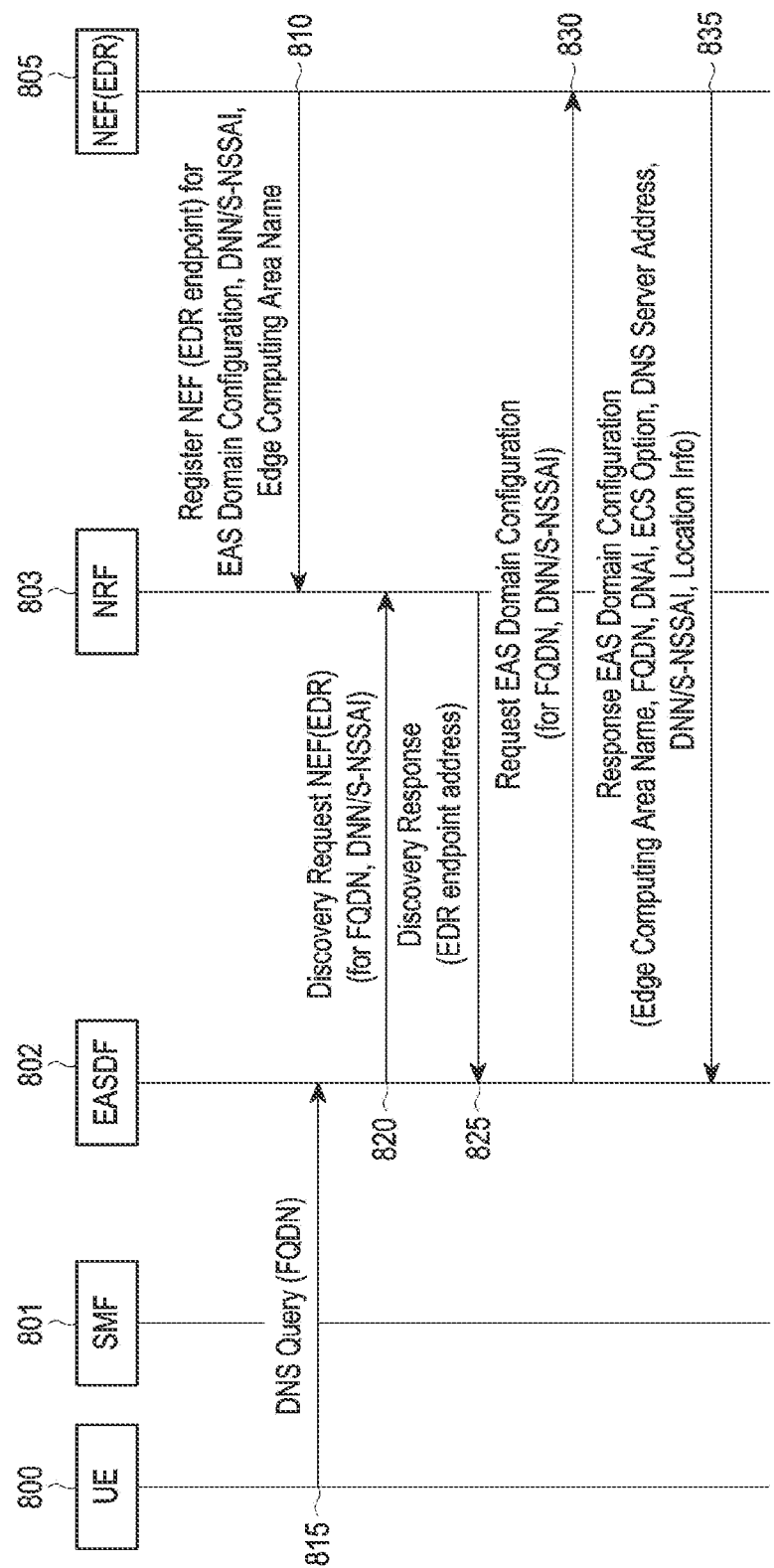
FIG. 8 is a view illustrating a procedure for requesting EAS domain configuration information by an EASDF according to an embodiment of the disclosure.

FIG. 8 is a view illustrating a procedure for requesting EAS domain configuration information by an EASDF according to an embodiment of the disclosure. Although the EDR is illustrated as one service function of NEF in FIG. 8, it will be understood that the embodiment of FIG. 8 is applicable even when the EDR exists as a separate NF.

Referring to FIG. 8, in operation 810, an NEF (EDR) 805, which processes EDR information, transmits, to an NRF 803, a registration request message for registering that the NEF (EDR) 805 is managing EAS domain configuration information. The registration request message transmitted from the NEF (EDR) 805 to the NRF 803 may include at least one of the following information.
- Endpoint address of NEF (EDR) 805
- Differentiator for differentiating EAS domain configuration information
- Network and slice identifier, DNN/S-NSSAI, to provide EAS domain configuration information Name, ECAN and/or DNAI, of the data center providing EAS domain configuration information In operation 815, the UE 800 transmits a DNS query message including FQDN to the EASDF 802 according to a request of the application layer.

In operation 820, the EASDF 802, receiving the DNS query message from the UE 800, identifies whether there is preconfigured EAS domain configuration information. When there is no EAS domain configuration information about the DNN/S-NSSAI currently connected by the UE 800 in the position of the UE 800 in the 3GPP system and/or the FQDN contained in the DNS query message, the EASDF 802 transmits a discovery request message for the NEF (EDR) 805 to the NRF 803 to discover the NEF (EDR) 805. The discovery request message transmitted from the EASDF 802 to the NRF 803 may include information about the DNN/S-NSSAI and/or FQDN.

In operation 825, the NRF 803 discovers the NEF (EDR) 805 storing EAS domain configuration information through information registered in operation 810. The NRF 803 transmits, to the EASDF 802, a response message including information about the endpoint address of the NEF (EDR) 805 requested for discovery by the EASDF 702, as a response to the discovery request message in operation 820.

In operation 830, when the endpoint address of the NEF (EDR) 805 is preconfigured in the EASDF 802 or the endpoint address of the NEF (EDR) 805 is obtained from the NRF 803 in operation 820 and operation 825, the EASDF 802 transmits a request message for EAS domain configuration information to the NEF (EDR) 805. The request message for the EAS domain configuration information may include at least one of the following information to specify the DNS query message of the UE 800.

FQDN
DNN/S-NSSAI
DNAI

In operation 835, the NEF (EDR) 805 transmits, to the EASDF 802, a response message including EAS domain configuration information, as a response to the request message in operation 830. The EAS domain configuration information may include at least one of the following information.

EAS identifier: FQDN
information for each edge computing service area
  ECAN
  associated DNAI
  ECS option: IP subnetwork address (that is, information added to the DNS query message to inform the DNS server of the position of the UE)
  An indicator as to whether to add an ECS option when the EASDF processes the DNS query message received from the UE
  DNS server address to be forwarded by EASDF
  EAS IP address range accessible from the associated DNAI (which may be used for registration of routing rules of ULCL)
edge computing service provider identifier (e.g., service provider ID or edge computing service provider ID)
edge computing subscriber group identifier (or subscriber group identifier);
  A group identifier for providing edge computing services only to subscribers belonging to the subscriber group.
  The SMF 801 identifies whether a subscriber belongs to a subscriber group from the UDM and then provides a pre-configured DNS response only to the corresponding subscriber.

Edge computing data network identifier: DNN/S-NSSAI

Fifth Embodiment

The fifth embodiment of the disclosure concerns a procedure for reporting a DNS message.

Figure 9:
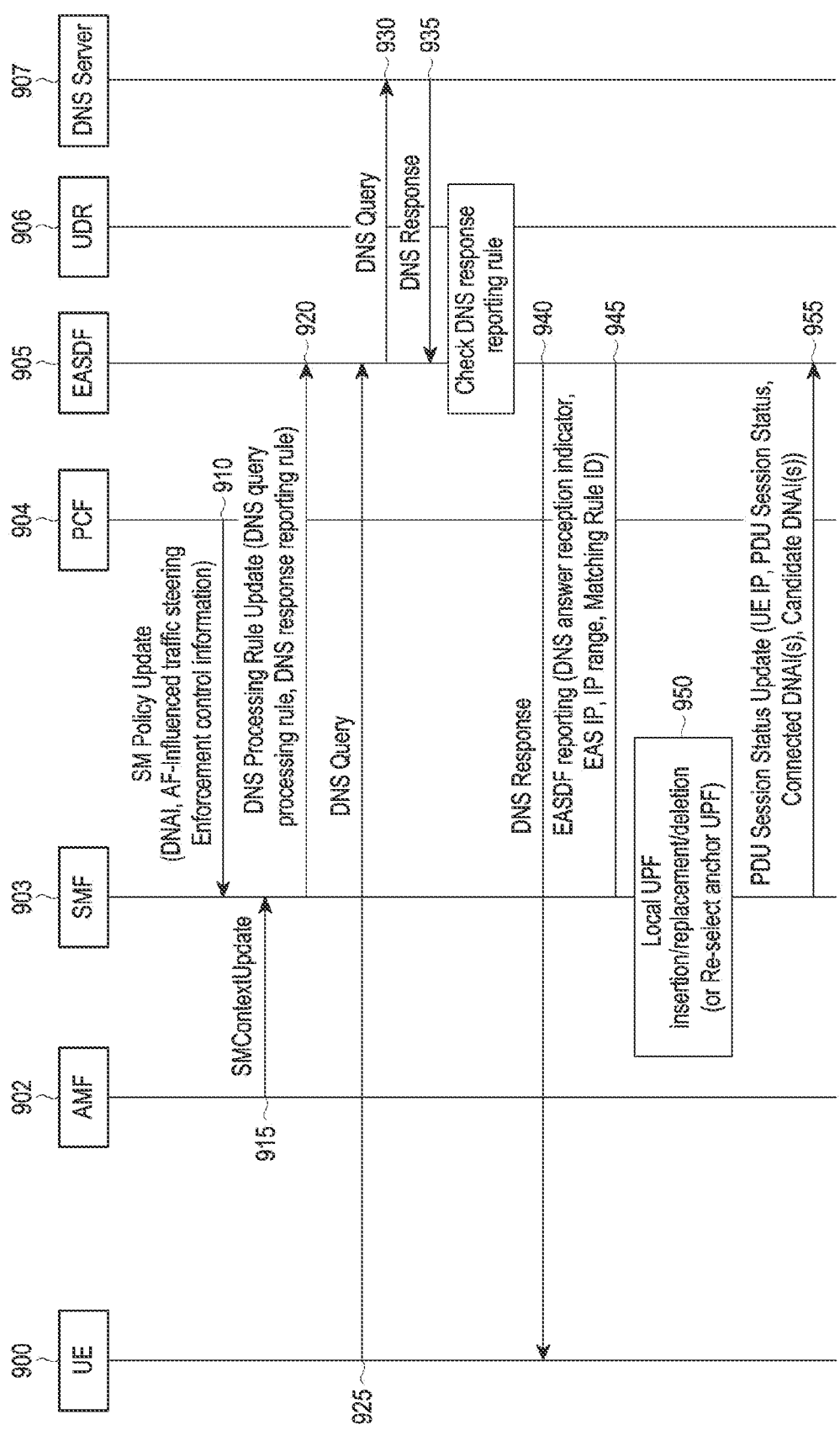
FIG. 9 is a view illustrating a procedure for reporting a DNS message by an EASDF according to an embodiment of the disclosure.

FIG. 9 is a view illustrating a procedure for reporting a DNS message by an EASDF according to an embodiment of the disclosure.

Referring to FIG. 9, in operation 910, a DNS message reporting procedure may be triggered by the AF or by an SM policy update message that is transmitted from the PCF 904 to the SMF 903 after an AF request message requested from the AF is transferred to the PCF 904. The DNS message reporting procedure may also be triggered by another NF or by the PCF 904. The SM policy update message transmitted from the PCF 904 to the SMF 903 may be transferred through association between the PCF and SMF connected per UE. Alternatively, a new association may be generated between the PCF 904 and the SMF 903 to transfer the SM policy update message.

The SM policy update message transmitted from the PCF 904 to the SMF 903 may include AF-influenced traffic steering enforcement control information. The AF-influenced traffic steering enforcement control information may include information about DNAI and traffic steering policy identifier and/or N6 traffic routing information per DNAI. The AF-influenced traffic steering enforcement control information may include AF subscription information about user plane change event. The AF-influenced traffic steering enforcement control information may include such information as UE IP address maintain indicator.

In operation 915, when the UE 900 moves, the AMF 902 may transmit an SM context update message to the SMF 903. The SM context update message transmitted by the AMF 902 to the SMF 903 may include at least one of the following information.

Information for identifying the data network and slice of UE 900 (e.g., DNN/S-NSSAI)
Information for identifying UE 900 (e.g., the network address of UE 900, IPv4 address, IPv6 prefix/address, Ethernet MAC address, and/or identifier (SUPI and/or GPSI) of UE 900)
List of DNAIs already connected with UE 900 through local UPF
List of DNAIs connectable with UE 900 through local UPF In operation 920, when a DNS message reporting rule for the UE 900 is set in the SMF 903 by the AF-influenced traffic steering enforcement control information per DNAI through operation 910, the SMF 903 may start a DNS message reporting procedure. Alternatively, when receiving an SM context update message from the AMF 902 when the UE 900 moves to the area corresponding to a designated DNAI while operation 910 is set, the SMF 903 may start a DNS message reporting procedure. Alternatively, when required to perform a DNS message reporting procedure by a separate DNS configuration-related NF, the SMF 903 may start a DNS message reporting procedure. Alternatively, when receiving subscriber information from the UDM 906, the SMF 903 may start a DNS message reporting procedure. Alternatively, the SMF 903 may start a DNS message reporting procedure by its own settings.

If the SMF 903 determines to start a DNS message reporting procedure when performing a PDU session generation procedure of the UE 900, the SMF 903 may start a subscription procedure for DNS message reporting.

If the SMF 903 determines to start a DNS message reporting procedure, the SMF 903 transfers a DNS message reporting rule to the EASDF 905. The DNS message reporting rule may be transferred together with the DNS message processing rule, or the DNS message reporting rule and the DNS message processing rule may be separately transferred to the EASDF 905. The DNS message processing rule is a rule for processing the DNS message transmitted from the EASDF 905 to the DNS client of the UE 900, like the DNS response message, or received from the DNS client of the UE 900 by the EASDF 905, like the DNS query message. The DNS message processing rule and the DNS message reporting rule may be messages received from the DNS server 907 or a processing or reporting rule for the message to be transmitted to the DNS server 907. The DNS message reporting rule may include at least one of the following information.

- DNS message detection rule: The DNS message detection rule is a rule for the EASDF 905 to detect a DNS message and may include at least one of the following information.
  - Information contained in the DNS header (e.g., indicator indicating whether DNS query or DNS response, DNS protocol number, differentiator for differentiating whether DNS over UDP or DNS over TLC, DNS over HTTP or DNS over HTTPS
  - Content of the DNS response message (e.g., IP address contained in the DNS answer section in the DNS response message or information for determining whether the IP address falls within a specific IP address range)
  - FQDN information included in the DNS message and information for determining whether the FQDN matches a designated FQDN (e.g., FQDN list or FQDNs expressed in regular expression))
  - Indicator indicating whether the DNS answer contained in the DNS message is an authoritative answer (AA)
- DNS message detection report type: the type of reporting a detected DNS message (e.g., the following types are possible, or other similar types are also possible) The reporting type may be expressed as a DNS message detection reporting condition)
- Report whenever detected,
- Report once when first detected
- Report once when DNS message for IP address FQDN associated with DNAI is detected
- Report once when or whenever the IP address information in the DNS answer corresponds to the IP address or IP address range in the detection rule
- Report once when or whenever the DNS answer and FQDN information associated therewith correspond to the detection rule
- Report when the RTT for the DNS server 907 and EASDF 905, measured by the EASDF 905, is a specific value or higher
- Report when various statistics information about the DNS server 907, measured by the EASDF 905 itself, is a threshold or more
- Report when the retaining period for DNS cache information for a specific FQDN internally managed by the EASDF 905 or DNS cache information related to a specific DNS server, or DNS cache information associated with a specific UE or DNS cache information associated with a specific DNAI expires so that the DNS cache information is deleted

- Information to be included in DNS message detection report
  - UE IP address, UE identifier, PDU session identifier DNN/S-NSSAI
  - Identifier of SMF 903 and identifier for identifying the UE's PDU session by SMF 903 (which may include at least one of, e.g., SM context ID, a differentiator for differentiating the connection or transaction between SMF 903 and EASDF 905, an identifier of the subscription requester subscribing to DNS response report subscription service from the SMF 903 to the EASDF 905 or a subscription request identifier allocated to identify a subscription request by the EASDF 905 itself after authorizing DNS message report subscription)
  - EAS IP address, IP address included in the DNS response message, or IP range matching the IP address
  - ECS option instructed by SMF 903 to be included in a specific EAS query message
  - Indicator indicating whether authoritative vs non-authoritative or whether there is authority
  - Candidate DNAI information matching or associated with EAP IP address
  - Address of the DNS server answering DNS query or address of the DNS server answering with authoritative response The DNS message reporting rule may include an identifier for identifying the DNS message reporting rule and an indicator indicating whether a reporting rule is newly added, changed, or deleted.

Upon receiving the DNS message reporting rule, the EASDF 905 may determine whether to perform DNS message reporting on the received DNS message or the transmitted DNS message In operation 925, the DNS client of the UE 900 may transmit a DNS query message to the EASDF 905. The DNS query message transmitted from the UE 900 may include at least one of the following information.
- IP address of UE 900 (IPv4 address and/or IPv6 address)
- Protocol number in IP header indicating DNS protocol (e.g., in the case of DNS over UDP, designated port number 53, in the case of DNS over TLS, number 22, or in the case of DNS over HTTP, 80 or 8080)
- DNS header information (e.g., information about the field indicating whether DNS query or response)
- FQDN: the FQDN value queried by UE 900 to identify the IP address of the corresponding EAS In operation 930, the EASDF 905 forwards the DNS query message to the DNS server 907 according to the DNS message processing rule received from the SMF 903. The EASDF 905 may store or update statistics information necessary to identify whether it meets the DNS message reporting condition to trigger DNS message reporting. The EASDF 905 may also identify whether the reporting condition for determining whether to perform DNS message reporting is met.

In operation 935, the EASDF 905 receives a DNS response message from the DNS server 907. The EASDF 905 may store or update statistics information necessary to identify whether it meets the DNS message reporting condition to trigger DNS message reporting. The EASDF 905 may also identify whether the reporting condition for determining whether to perform DNS message reporting is met.

The EASDF 905 detects the DNS response message and, if the DNS response message meets the reporting type and/or reporting condition included in the DNS message reporting rule, may determine to report on DNS message.

In operation 940, the EASDF 905 transmits the DNS response message to the UE 900.

In operation 945, the EASDF 905, if the DNS response message meets the reporting type and/or reporting condition included in the DNS message reporting rule, determines to report on DNS message and transmits a report message for the DNS message to the SMF 903. Although the embodiment of FIG. 9 describes that it is determined whether to report on the DNS message in operation 940, determining whether to report on the DNS message may also be performed in operation 925 for receiving the DNS query message or in operation 930 for receiving the DNS response. If the EASDF 905 determines to report on the DNS message, the EASDF 905 transfers necessary information to the SMF 903 by referring to the information that needs to be included in the DNS message report included in the DNS message reporting rule received through operation 920. The EASDF 905 may extract information to be included in the DNS message report from the UE context information stored per UE in the EASDF 905 and/or information included in the transmitted/received DNS message. The DNS report message may include internal statistics information recorded in the EASDF 905. Examples of the statistics information may include the number of transmitted/received DNS query and response messages, the number of messages for each IP address range, and the number of messages for each DNAI or DNN/S-NSSAI.

In operation 945, the SMF 903 receives the DNS report message for the DNS message from the EASDF 905. In operation 950, the SMF 903 may determine whether to add, delete, or change the local UPF based on at least one of the information contained in the DNS report message, information set in the SMF 903, or subscription information or operator's policy information set from the PCF 904 or another NF in 5GC. The SMF 903 may reselect an anchor UPF based on at least one of the information contained in the DNS report message, information set in the SMF 903, or subscription information or operator's policy information set from the PCF or another NF in 5GC. If determining to reset the anchor UPF, the SMF 903 may transmit a PDU session release request message to the UE 900, so that a series of procedures for changing the UPF in session and service continuity (SSC) mode 2 may be performed. The SMF 903 may determine to reselect an anchor UPF in SSC mode 3 and, in this case, the SMF 903 may transfer PDU session update information to the UE 900 to thereby initiate an anchor UPF change procedure.

In operation 955, when adding/deleting/updating of the local UPF is determined through operation 950 and a series of related operations are completed, or when the SMF 903 successfully performs a series of operations for reselecting an anchor UPF, in operation 955, the SMF 903 may transfer a PDU session state update message to the EASDF 905 to report the result of update about the state of the PDU session. The PDU session state update message may include UE IP address, PDU session state information, list of DNAIs already connected with UE 900 via the local UPF, and/or list of DNAIs connectable with UE 900 via the local UPF. Alternatively, the SMF 903 may newly generate a DNS message processing rule or DNS message reporting rule and transfer it to the EASDF 905. Alternatively, the SMF 903 may perform a procedure for indicating a change in the DNS message processing rule, along with the EASDF 905. As an example, if additional generation of a local UPF associated with a specific DNAI has been successfully performed via operation 950 so that it is intended to change the DNS message reporting rule, the SMF 903 may prevent further generation of an additional DNS message report by changing the condition for the DNS message reporting rule along with the indicator indicating a change in the DNS message reporting rule or deleting the corresponding DNS message reporting rule.

Figure 10:
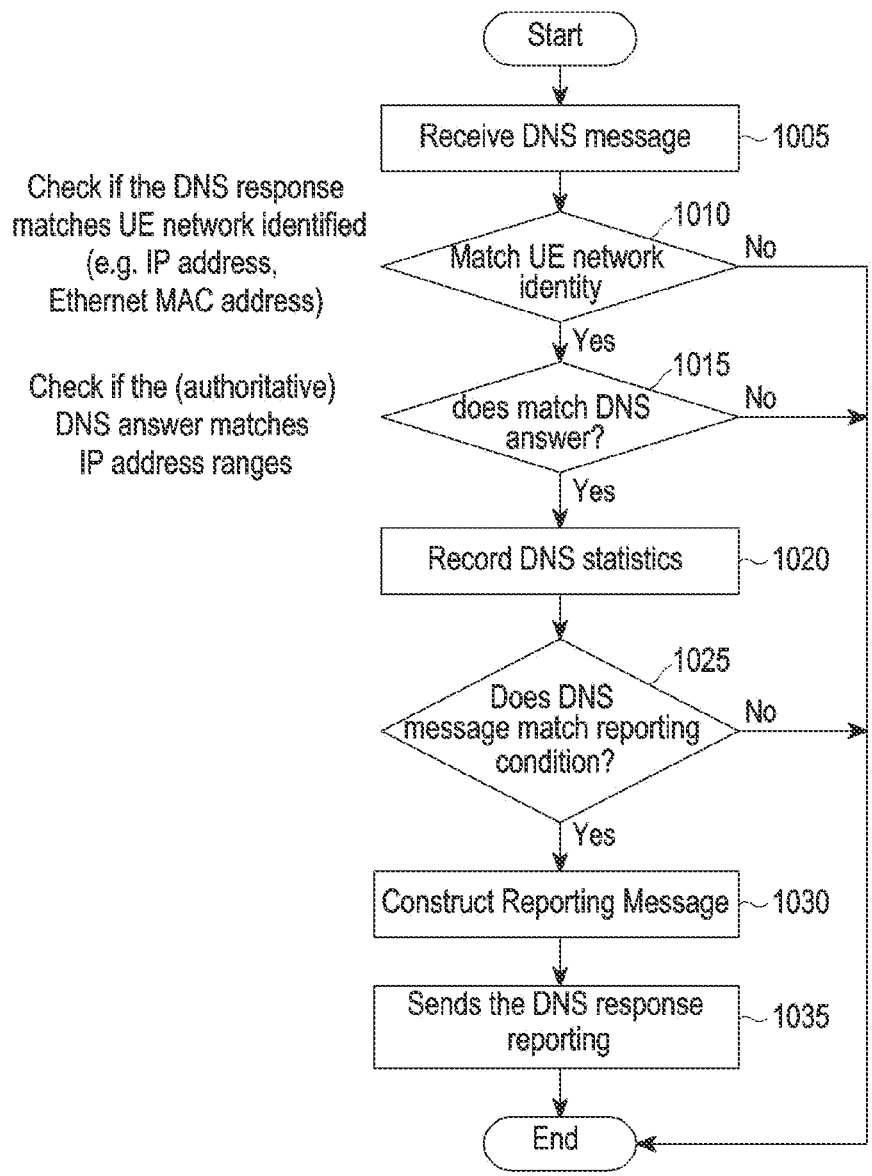
FIG. 10 is a view illustrating a procedure for reporting a DNS message by an EASDF according to an embodiment of the disclosure.

FIG. 10 is a view illustrating a procedure for reporting a DNS message by an EASDF according to an embodiment of the disclosure.

Referring to FIG. 10, in operation 1005, the EASDF receives a DNS message.

In operation 1010, the EASDF, which receives the DNS message, identifies whether UE context information configured in the EASDF includes a UE identifier matching the DNS message. As an example, the EASDF may identify the UE's IP address for the received DNS message and whether the IP address of the UE (e.g., the source IP address of the DNS query message or the destination IP address of the DNS response message) matches the DNS report message detection rule and reporting condition received from the SMF.

In operation 1020, the EASDF identifies the message type (e.g., whether DNS query message or DNS response message) included in the header information of the received DNS message and information (e.g., whether FQDN matches or whether the IP address in the response message matches) included in the content of the received DNS message. The EASDF may store, e.g., the type of the received DNS message and the number of DNS messages received thus far, as internally managed statistics information.

In operation 1025, the EASDF determines whether the received DNS message matches the reporting type and/or condition included in the DNS message reporting rule received from the SMF, based on the statistics information and the received DNS message and determines whether to perform DNS message reporting. When the received DNS message matches the reporting type and/or condition included in the DNS message reporting rule received from the SMF, the EASDF performs operation 1030. When the received DNS message does not match the reporting type and/or condition included in the DNS message reporting rule received from the SMF, the EASDF terminates the DNS message reporting procedure.

In operation 1030, the EASDF generates a DNS report message. The DNS report message may include DNS message-related statistics information which the EASDF stores on its own and/or information to be included in the DNS response message received from the SMF. In this case, the information to be included in the DNS response message received from the SMF may be extracted by the EASDF from the statistics information or the received DNS message.

In operation 1035, the EASDF transfers the DNS report message to the SMF. If a separate report destination address is pre-registered in the EASDF, the EASDF transmits the DNS report message at the separately registered destination address. The destination address of the DNS report message may be the SMF or may be a separate AF registering DNS message reporting through another NF (e.g., NWDAF) or NEF in 5GC.

Sixth Embodiment

The sixth embodiment of the disclosure describes a procedure for an SMF to generate a DNS message processing rule and transfer the generated DNS message processing rule to an EASDF.

Figure 11A:
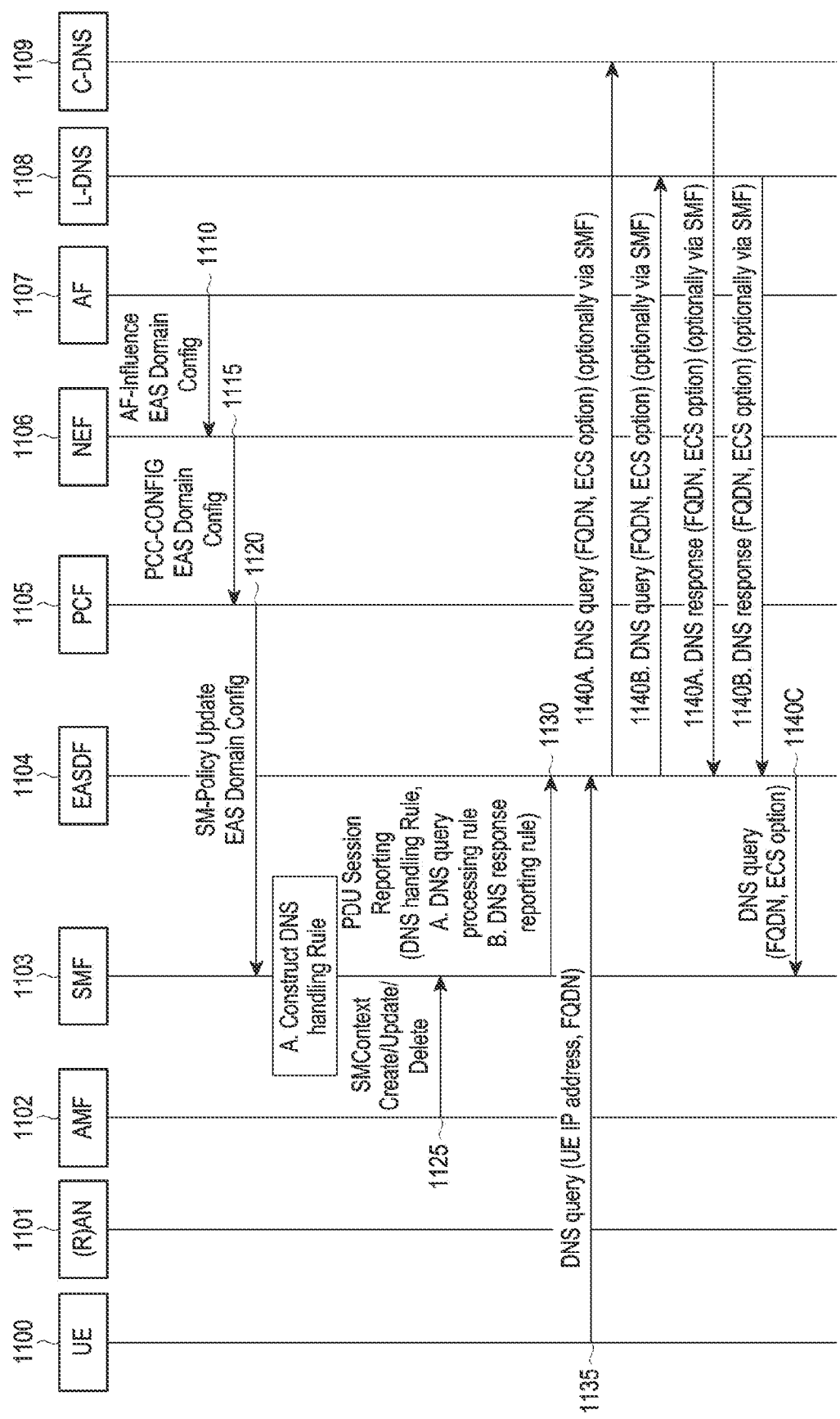
FIGS. 11A and 11B are views illustrating a procedure for transferring a DNS message processing rule to an EASDF by an SMF according to various embodiments of the disclosure.
Figure 11B:
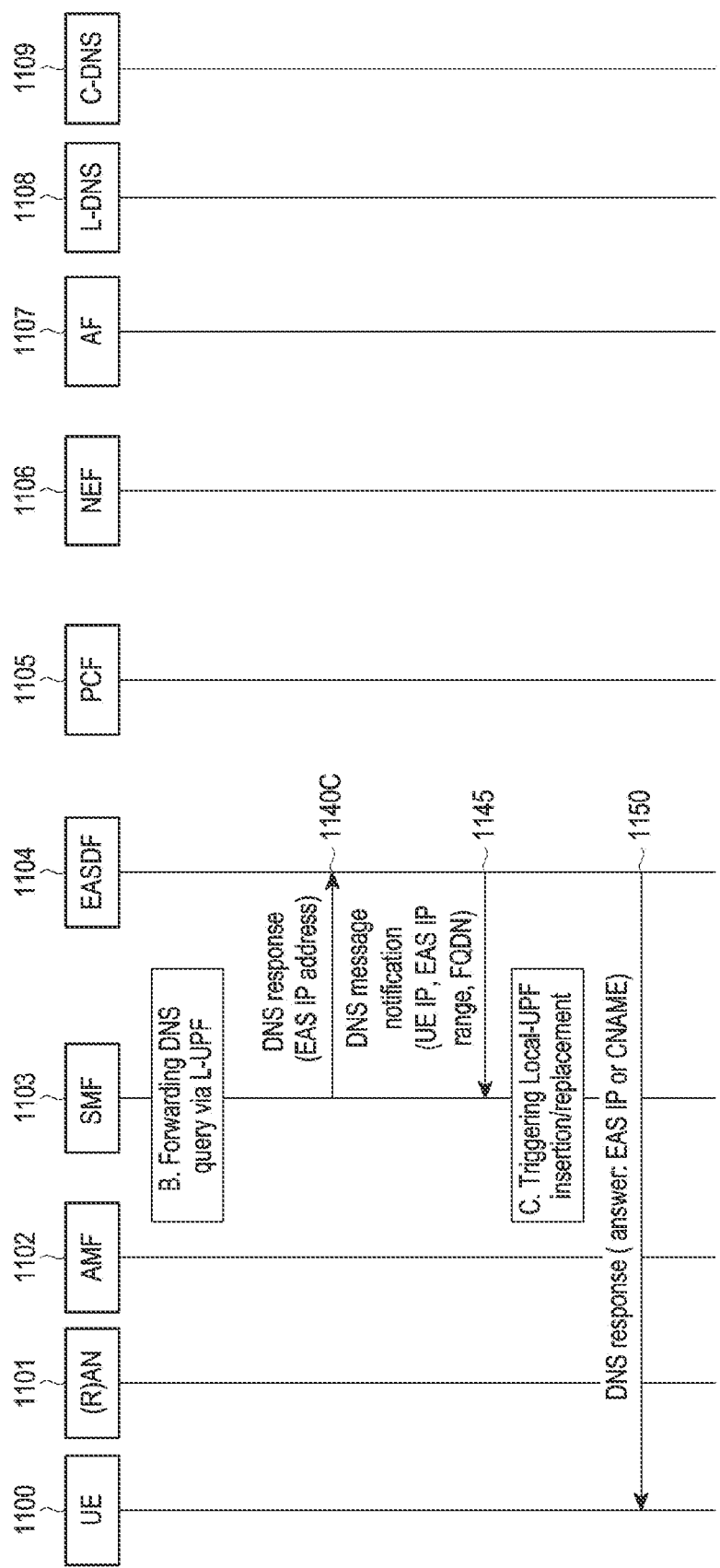

FIGS. 11A and 11B are views illustrating a procedure for transferring a DNS message processing rule to an EASDF by an SMF according to various embodiments of the disclosure.

Referring to FIGS. 11A and 11B, in operation 1110, the AF 1107 transmits EAS domain configuration information to the NEF 1106. The EAS domain configuration information may include at least one of the following information.

FQDN and FQDN expressed as a regular expression (e.g., www.eas1.com or *.eas1.com)
    DNS server address
    ECS option
    DNAI
    ECAN The EAS domain configuration information may include at least one of multiple DNS server addresses, multiple ECS options, multiple DNAIs, or multiple ECAN information to simultaneously configure multiple edge computing areas for one FQDN.

In operation 1115, the NEF 1106 transfers the EAS domain configuration information to the PCF 1105. As an example, the NEF 1106 may store the EAS domain configuration information in the UDR, and the UDR may notify the PCF 1105 of the EAS domain configuration information through a notification procedure for a change in the corresponding database. As another example, the NEF 1106 may directly transfer the EAS domain configuration information to the PCF 1105. The EAS domain configuration information may be included and transmitted in the AF-influenced traffic steering enforcement control information which is included in the SM policy update message described in connection with the fifth embodiment or may be transferred through a separate independent information element.

In operation 1120, the PCF 1105 transfers the EAS domain configuration information to the SMF 1103 through an SM policy update procedure. As an example, the SMF 1103 receives, from the PCF 1105, the EAS domain configuration information or AF-influenced traffic steering enforcement control information containing the EAS domain configuration information. The SMF 1103 may determine to generate/modify/delete the DNS message processing rule based on at least one of the received EAS domain configuration information, subscriber information received from the UDM, information about the current UE 1100 received from the AMF 1102, DNAI information associated with the position of the current UE 1100, DNN/S-NSSAI information about a PDU session generated or to be generated and related PDU session parameter (e.g., SSC mode 1/2/3 information), policy information managed by the SMF 1103 itself as to whether to provide ULCL/branching point (BP), or policy information received from the PCF 1105 and may also generate the content of the DNS message rule.

The DNS message processing rule may include at least one of the following information.

DNS message processing rule provider (e.g., SMF 1103 identifier or a separate provider)
    Indicator indicating to add/delete/change a DNS message processing rule
    DNS message processing rule identifier: an identifier to differentiate rules in the NF generating the DNS message processing rule. This identifier is in charge of ensuring to maintain the uniqueness of the DNS message processing rule identifier in the NF (e.g., SMF 1103) generating the rule.
    DNS message detection rule: The DNS message detection rule is a rule for the EASDF 1104 to detect a DNS message and may include at least one of the following information.
        Information contained in the DNS header (e.g., indicator indicating whether DNS query or DNS response, DNS protocol number, differentiator for differentiating whether DNS over UDP or DNS over TLC, DNS over HTTP or DNS over HTTPS
        Information included in the DNS response message (e.g., IP address contained in the DNS answer in the DNS response message or information for determining whether the IP address falls within a specific IP address range)
        FQDN information included in the DNS message and information for determining whether the FQDN matches a designated FQDN (e.g., FQDN list or FQDNs expressed in regular expression))
        Indicator indicating for identifying whether the DNS answer contained in the DNS message is an authoritative answer or not and indicating whether it is an authoritative answer
    EAS domain configuration information for DNS message processing: EAS domain configuration information includes at least one of the following information.
    FQDN and FQDN expressed as a regular expression (e.g., www.eas1.com or *.eas1.com)
        DNS server address: DNS server address to which to forward DNS query message
        Whether to add an ECS option and the value of the ECS option
        Connected local DN identifier list: denotes an identifier list of the local DN connected from the current UE 1100 through the RAN 1101 to the local UPF to exchange PDUs with the UE. The identifier may be expressed as a DNAI associated with the local DN.
        Candidate local DN identifier list: denotes an identifier list of the local DN that is not connected from the current UE 1100 through N3/N9 tunnel to the local DN denoted as DNAI but may be connected by generating a local UPF depending on the determination by the SMF 1103 in the position of the current UE 1100. The local DN identifier may be expressed as a DNAI associated with the local DN.
        ECAN: a name that may represent the position in the 3GPP access network where the current UE 1100 is positioned. The ECAN is a name representing an area in the 3GPP access network, which may be represented as a TAI list, a cell ID list, a PLMN ID list, a non-public network (NPN) ID list, a PRA, or an AOI list or as a combination of the lists.
    per-UE context information: per-UE context information is a context that is managed per UE for the EASDF 1104 to perform an operation according to the DNS processing rule on the DNS message received from the SMF 1103. The per-UE DNS message processing context information may be generated by receiving the PDU session state report message transferred from the SMF 1103 when a PDU session is generated. Alternatively, the per-UE DNS message processing context information may be generated by receiving a DNS message processing rule for the UE 1100 from the SMF 1103 when a PDU session is generated. The per-UE context information may be deleted by the EASDF 1104 upon receiving a UE context release message from the SMF 1103 when the PDU session is terminated or may be deleted in the EASDF 1104 when all the DNS message processing rules for the UE 1100 are removed from the SMF 1103. The per-UE context information may include at least one of the following information.

UE identifier information: UE's IPv4 or IPv6 address, UE's MAC address, or UE's SUPI, GPSI, or mobile station international subscriber directory number (MSISDN) information PDU session identifier for the UE 1100 or identifier by which the SMF 1103 is able to differentiate the context of the UE 1100 (e.g., SM context identifier)

DNN/S-NSSAI

Connected local DN identifier list: denotes an identifier list of the local DN connected from the current UE 1100 through the RAN 1101 to the local UPF to exchange PDUs with the UE 1100. The local DN identifier may be expressed as a DNAI associated with the local DN.

Candidate local DN identifier list: denotes an identifier list of the local DN that is not connected from the current UE 1100 through N3/N9 tunnel to the local DN denoted as DNAI but may be connected by generating a local UPF depending on the determination by the SMF 1103 in the position of the current UE 1100. The local DN identifier may be expressed as a DNAI associated with the local DN.

ECAN: a name that may represent the position in the 3GPP access network where the current UE 1100 is positioned. The ECAN is a name representing an area in the 3GPP access network, which may be represented as a TAI list, a cell ID list, a PLMN ID list, an NPN ID list, a PRA, or an AOI list or as a combination of the lists.

In operation 1125, the AMF 1102 transmits an SM context generation/update message to the SMF 1103 so that a PDU session of the UE 1100 is generated or, as the UE 1100 moves, the AMF 1102 updates the position information about the UE 1100, or the state of the PDU session is updated. The SM context generation/update message may include at least one of position information about the UE 1100, the identifier of the UE 1100, or DNN/S-NSSAI information for identifying the PDU session of the UE 1100.

In operation 1130, the SMF 1103, which receives the SM context generation/update message, may generate or update a DNS message processing rule. The DNS message processing rule may include a processing rule for the DNS query message, a processing rule for the DNS response message, and a reporting rule for the DNS response message. The DNS message processing rule may be generated/updated based on at least one of the following information.

Subscriber information about the UE 1100 received from the UDM (e.g., UE identifier, whether edge computing is supported, whether EASDF is utilized, subscriber class information)

EAS domain configuration information received from the PCF 1105

The SMF 1103 may generate a DNS message processing rule in operation 1120 or newly generate a DNS message processing rule in operation 1125.

If, in operation 1120 or its previous procedures, the SMF 1103 generates a DNS message processing rule for the UE 1100 and transfers it to the EASDF 1104, but the EAS domain configuration information is modified from the PCF 1105 in operation 1120, or if AF-influenced traffic steering enforcement control information is modified, the SMF 1103 may determine whether to newly generate a DNS message processing rule, update the existing DNS message processing rule, or delete the existing DNS message processing rule. When the SMF 1103 determines to generate, update, or delete a DNS message processing rule, the SMF 1103 may transfer, to the EASDF 1104, a rule to instruct to generate, update, or delete a DNS message processing rule. Alternatively, the SMF 1103 may transfer a message requesting to generate, update, or delete a DNS message processing rule to the EASDF 1104. Alternatively, the SMF 1103 may transmit a message to report the state for the UE's PDU session to the EASDF 1104 and, in this case, the PDU session state report message may include the DNS message processing rule.

After receiving the DNS message processing rule from the SMF 1103, the EASDF 1104 stores the DNS message processing rule.

In operation 1135, the EASDF 1104 receives a DNS query message from the UE 1100. The DNS query message transmitted from the UE 1100 may include at least one of the following information.

IP address of UE 1100 (e.g., IPv4 address or IPv6 address)

Protocol number in IP header indicating DNS protocol (e.g., in the case of DNS over UDP, designated port number 53, in the case of DNS over TLS, number 22, or in the case of DNS over HTTP, 80 or 8080)

DNS header information (e.g., information about the field indicating whether DNS query or response)

FQDN: the FQDN value queried by UE 1100 to identify the IP address of the corresponding EAS In operation 1140A, if the DNS server address set in the EASDF 1104 is set as the central DNS (C-DNS) server address, the EASDF 1104 sends a DNS query message to the C-DNS server 309. The C-DNS server 1109 performs DNS resolution on the FQDN included in the DNS query message. To this end, the C-DNS server 1109 may transmit a DNS query message to a plurality of other DNS server(s) and receive a response thereto. In this case, the plurality of other servers may identify the ECS option transferred by the EASDF 1104 so as to identify which edge computing area the UE 1100 is in. Through this, the C-DNS server 1109 identifies the IP address of the EAS for the FQDN requested by the UE 1100. The C-DNS server 1109, which receives the DNS query message from the EASDF 1104, transmits, to the EASDF 1104, a DNS response message including the identified IP address of the EAS.

In operation 1140B, when the set DNS server address is the address of the local DNS (L-DNS) server 1108, the EASDF 1104 transfers a DNS query message to the L-DNS server 1108 in a similar manner to that of operation 355A. The L-DNS server 1108 may identify the EAS IP address in a similar manner to that of the above-described C-DNS server 1109. The L-DNS server 1108, which receives the DNS query message from the EASDF 1104, transmits, to the EASDF 1104, a DNS response message including the identified IP address of the EAS.

In operation 1140C, when the set DNS server address is transferred via the SMF 1103, the EASDF 1104 transfers a DNS query message to the SMF 1103. Upon receiving the DNS query message, the SMF 1103 performs routing to send the DNS query message through preset information to the destination address. The DNS query message is forwarded to a UPF (e.g., L-UPF) appropriate for transmission to the DNS server, and the DNS query message is transmitted to the DNS server through the appropriate UPF. The DNS server identifies the EAS IP address of the DNS query message requested by the UE in a similar manner to that of the above-described C-DNS server 1109. The DNS server, which receives the DNS query message from the EASDF 1104 via the SMF 1103, replies with a DNS response message including the identified IP address of the EAS. As an example, the DNS response message transmitted from the DNS server is transferred to the SMF 1103 through an appropriate UPF. The SMF 1103 forwards the DNS response message to the EASDF 1104.

The DNS response message received by the EASDF 1104 may include the FQDN requested by the UE 1100 and the EAS IP address corresponding thereto. The EASDF 1104, receiving the DNS response message, may identify a DNS message processing rule, previously set through the SMF 1103, e.g., the DNS message processing rule contained in the PDU session state report message received in operation 1130. The EASDF 1104 may determine whether the DNS response message meets a condition for processing the DNS response message through the DNS response message processing rule contained in the DNS message processing rule. The EASDF 1104 may determine whether the DNS response message meets a condition for reporting the DNS response message through the DNS response message reporting rule contained in the DNS message processing rule.

In operation 1145, when the DNS response message meets the condition for reporting the DNS response message, contained in the DNS response message reporting rule, the EASDF 1104 may generate a DNS report message and transfer the generated DNS report message to the SMF 1103. The DNS report message may include at least one of the UE IP address, FQDN (requested by the UE 1100), or the EAS IP address (for the FQDN requested by the UE 1100). A specific procedure for the EASDF 1104 to transfer the DNS report message to the SMF 1103 has been disclosed above with reference to FIG. 10.

The SMF 1103 may trigger the adding, deleting, or changing of the local UPF based on at least one of the information contained in the DNS report message received from the EASDF 1104, information set in the SMF 1103, or subscription information or operator's policy information set from the PCF 1105 or another NF in 5GC.

In operation 1150, the EASDF 1104 transmits, to the UE 1100, the DNS response message containing the EAS IP address for the FQDN requested by the UE 1100.

Seventh Embodiment

DNS configuration information for non-UE specific EAS may be transferred without going through SMF. In the seventh embodiment of the disclosure, a procedure is described in which the EASDF forwards a DNS message to an appropriate DNS server using the UDR function or forwards a DNS message using UDR to select an appropriate ECS option.

Figure 12:
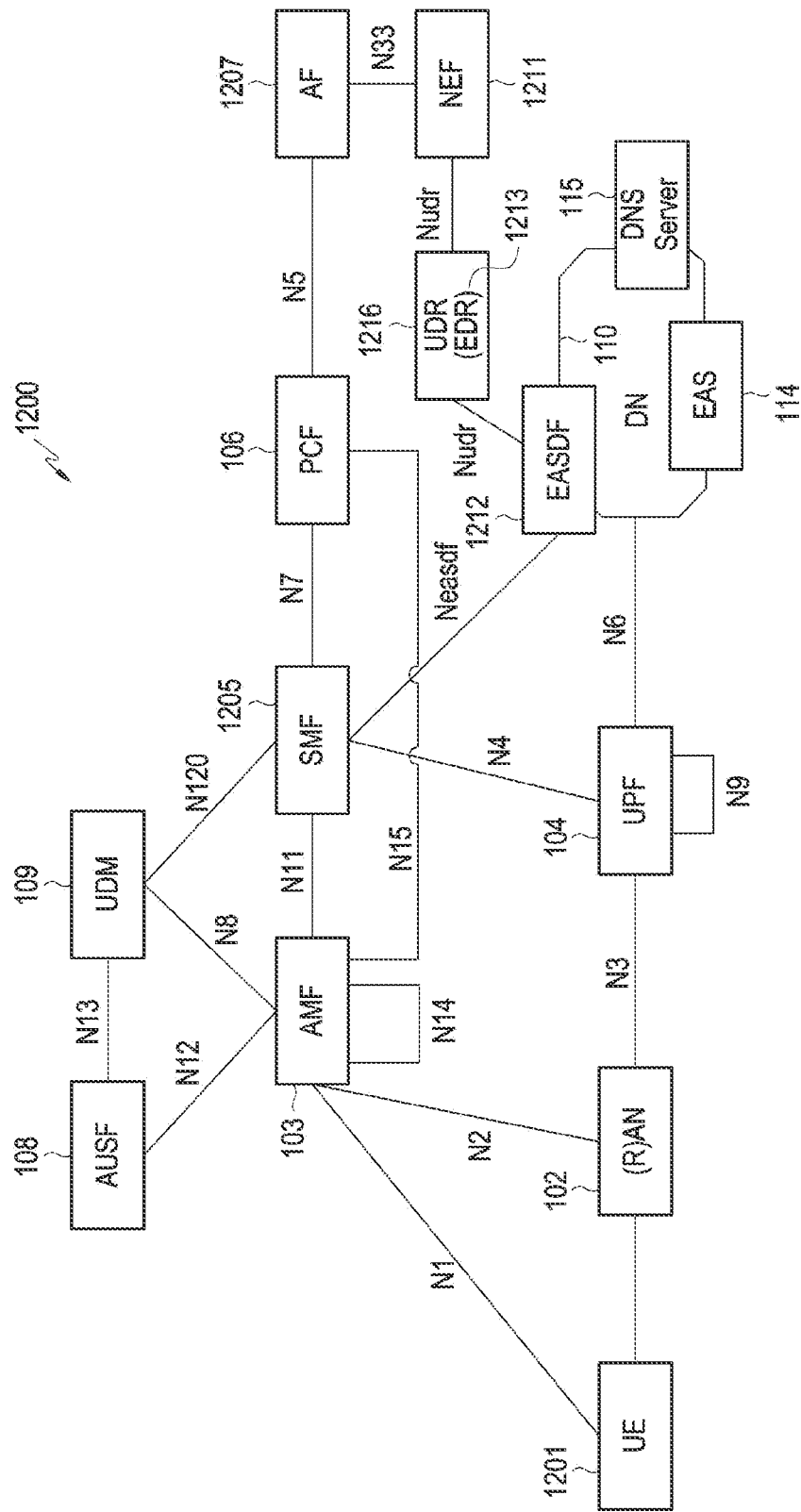
FIG. 12 is a view illustrating a network structure and interface of a 5G system according to an embodiment of the disclosure.

FIG. 12 is a view illustrating a network structure and interface of a 5G system according to an embodiment of the disclosure. In the seventh embodiment of the disclosure, a method for utilizing the network structure of FIG. 12 to previously prepare EAS domain configuration information using UDR is described.

The network structure of FIG. 12 includes a UDR 1216 in addition to the network structure of FIG. 1. Unlike the network structure of FIG. 1, the network structure of FIG. 12 does not include a separate EAS domain repository (EDR) (e.g., the EDR 113 of FIG. 1). EDR 1213 denotes data about the EAS domain configuration information stored in the UDR 1216.

Referring to FIG. 12, the UDR 1216 stores EAS domain configuration information. The EAS domain configuration information is configuration information about the DNS server that resolves IP address for FQDN for the operator supporting edge computing to process the DNS name of the EAS installed on the edge computing platform. In other words, the EAS domain configuration information may include DNS server configuration information. As an example, the EAS domain configuration information may include at least one of DNS server address, ECS option, DNAI, corresponding UE position (TAI, cell ID, etc.) for each FQDN. The NEF 1211 is connected to the UDR 1216 through a reference point Nudr and stores the EAS domain configuration information received from the AF 1207 in the UDR 1216. The EASDF 1212 obtains EAS domain configuration information from the UDR 1216 through the reference point Nudr. The EASDF 1212 is connected with the SMF 1205 through a reference point Neasdf.

In the seventh embodiment of the disclosure, the EASDF 1212 subscribes to a notification service for EDR information of the UDR 1216 when first installed or when an EASDF context is generated/changed. If receiving EAS domain configuration information from the AF 1207, the NEF 1211 stores it through the UDR 1216, and the UDR 1216 notifies the EASDF 1212 of a change in the EAS domain configuration information. Upon receiving the notification of the change in the EAS domain configuration information, the EASDF 1212 updates the EAS domain configuration information. If the UE 1201 transmits a DNS query message, the EASDF 1212 identifies the DNS message rule received from the SMF 1205. If there is no rule received for FQDN but there is information related to the UDR 1216, the EASDF 1212 transmits a DM query request message to the UDR 1216 to identify whether there is EAS domain configuration information. When the UDR 1216 has EAS domain configuration information, the EASDF 1212 transfers a DNS query message to the DNS server according to a corresponding rule.

Figure 13A:
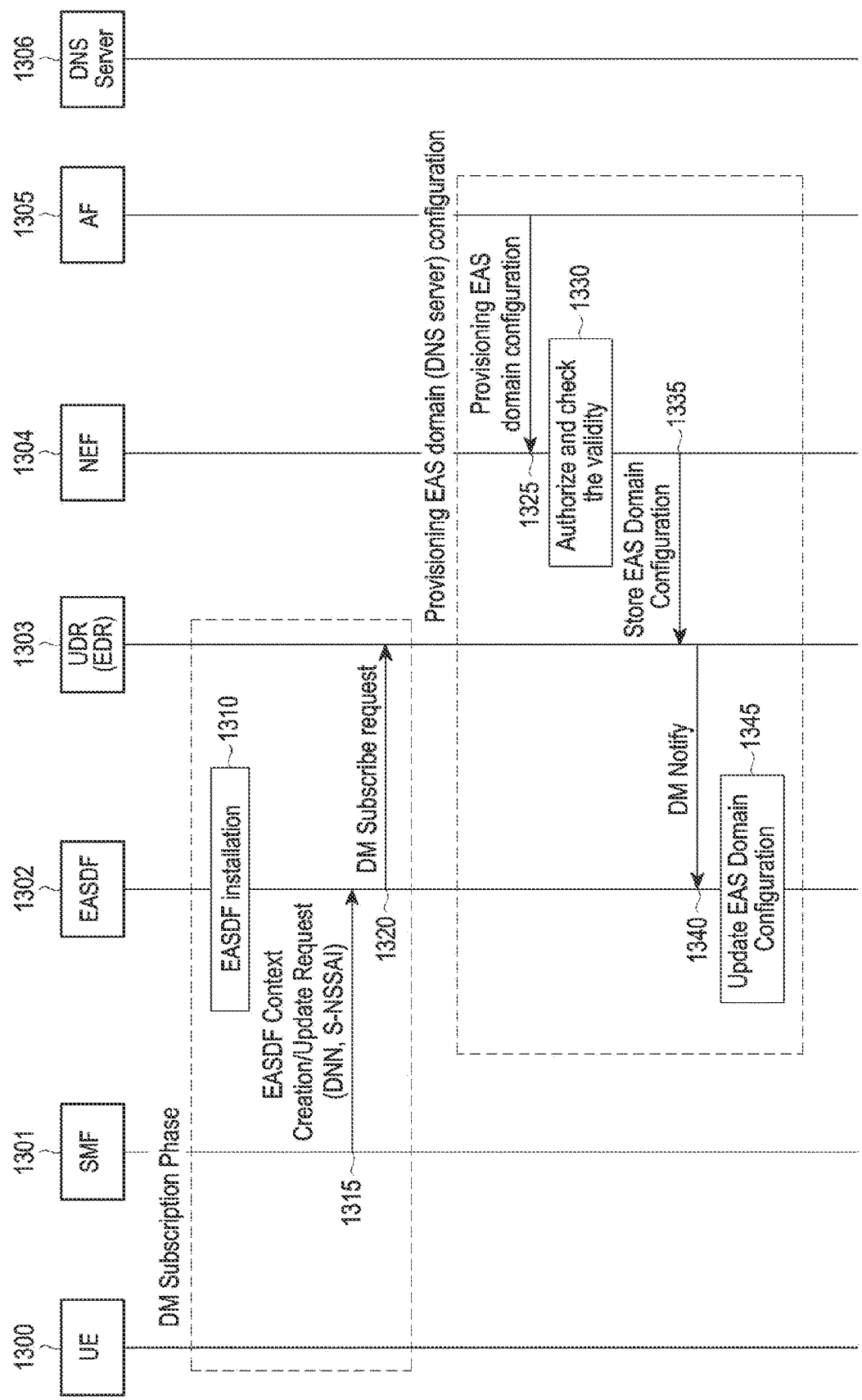
FIGS. 13A and 13B are views illustrating a procedure for processing a DNS message using a user data repository (UDR) function by an EASDF according to various embodiments of the disclosure.
Figure 13B:
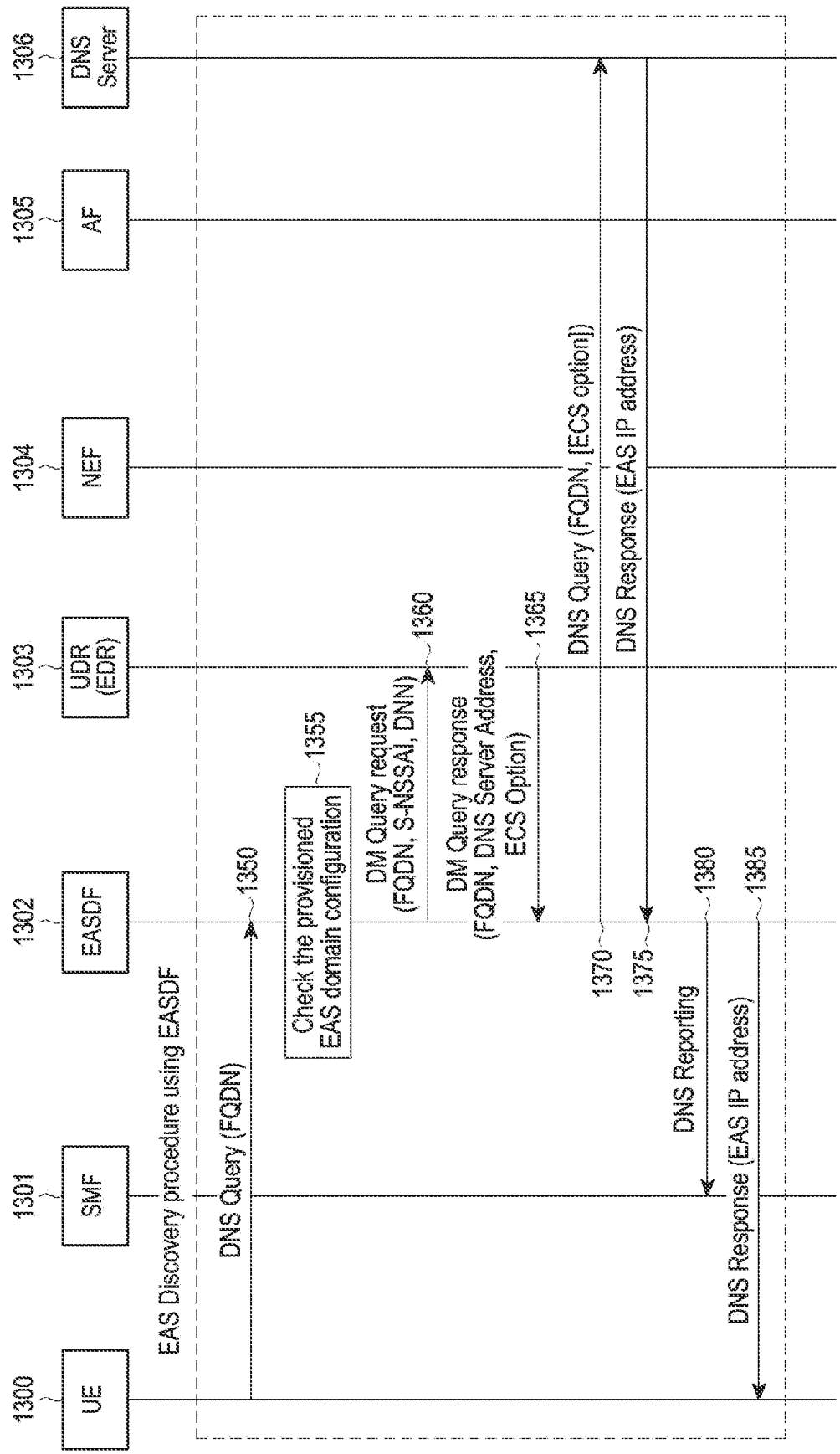

FIGS. 13A and 13B are views illustrating a procedure for processing a DNS message using a UDR function by an EASDF according to various embodiments of the disclosure. The network structure of FIG. 12 is applied to the network structure of FIGS. 13A and 13B.

Referring to FIGS. 13A and 13B, in operation 1310, the EASDF 1302 is initially installed or instantiated.

In operation 1315, the EASDF 1302 receives a message to request to generate or update an EASDF context from the SMF 1301. The EASDF context generation or update request message received from the SMF 1301 by the EASDF 1302 may include DNN and/or S-NSSAI for the PDU session of the UE 1300, IP address of the UE 1300, PDU session ID, and an indicator to permit self-use of DNS message processing rule to allow DNS message to be transmitted through EAS domain configuration information ("self DNS message processing rule use indicator").

The EASDF 1302 may directly process the DNS message received from the UE 1300 using the EAS domain configuration information, which is not related to a specific UE, even without a DNS message processing rule from the SMF 1301. The SMF 1301 may include, in an EASDF context generation or update message, an indicator permitting the EASDF 1302 to directly process the DNS message using the EAS domain configuration information stored in the UDR 1303, as well as the DNS message processing rule transmitted from the SMF 1301 to the EASDF 1302, and transmit it to the EASDF 1302.

In operation 1320, the EASDF 1302, which receives the EASDF context generation or update request message from the SMF 1301, transmits a DM subscribe request message to the UDR (EDR) 1303, which stores and manages the EAS domain configuration information, to receive a notification of a change in data about the EAS domain configuration information.

In operation 1325, when a new EAS is installed, the AF 1305 generates an AF request message for provisioning EAS domain configuration information and transmits an AF request message containing the EAS domain configuration information to the NEF 1304.

In operation 1330, the NEF 1304 identifies whether the AF 1305 is an NF capable of provisioning EAS configuration information. The NEF 1304 identifies whether the EAS domain configuration information included in the AF request message received from the AF 1305 has information conflicting with the existing EAS domain configuration information. When the EAS domain configuration information included in the AF request message received from the AF 1305 conflicts with the existing EAS domain configuration information or the AF 1305 is unable to provision the EAS domain configuration information, the NEF 1304 may reject the AF request message.

In operation 1335, the NEF 1304 stores the EAS domain configuration information included in the AF request message in the UDR 1303.

In operation 1340, when there is a subscribed request for a change in the data of the EAS domain configuration information, i.e., when a DM subscribe request message is previously received from the EASDF 1302, the UDR 1303 transmits a DM notification message about a change in the EAS domain configuration information to the EASDF 1302. The DM notification message may include the EAS domain configuration information included in the AF request message stored in operation 1335.

In operation 1345, the EASDF 1302 stores the EAS domain configuration information included in the DM notification message received from the UDR 1303 or updates the existing EAS domain configuration information with the EAS domain configuration information received from the UDR 1303.

In operation 1350, the EASDF 1302 receives a DNS query message including FQDN from the UE 1300.

In operation 1355, the EASDF 1302 identifies whether there is a DNS message processing rule received from the SMF 1301. The EASDF 1302 identifies whether there is preset information about FQDN.

In operation 1360, when there is no DNS message processing rule about the DNS query message received from the UE 1300, the EASDF 1302 transmits a DM query request message to the UDR (EDR) 1303 to identify whether there is EAS domain configuration information about the FQDN included in the DNS query message received from the UE 1300. The DM query request message transmitted from the EASDF 1302 to the UDR 1303 may include the FQDN included in the DNS query message received from the UE 1300 and DNN and/or S-NSSAI for the PDU session of the UE 1300 received from the SMF 1301 in operation 1315. In operation 1315, when the EASDF 1302 receives a self DNS message processing rule-used DNS processing permit indicator from the SMF 1301, the EASDF 1302 itself may generate a DNS message processing rule using the EAS domain configuration information stored in the UDR (EDR) 1303. The EASDF 1302 may process the DNS query message received from the UE 1300 through the self-generated DNS processing rule.

In operation 1365, the UDR (EDR) 1303, which receives the DM query request message from the EASDF 1302, transmits a DM query response message including the EAS domain configuration information stored in operation 1335 to the EASDF 1302. The EAS domain configuration information included in the DM query response message may include at least one of the following information.
    EAS identifier: FQDN
    information for each edge computing service area
        ECAN
        associated DNAI
        ECS option: IP subnetwork address (that is, information added to the DNS query message to inform the DNS server 1306 of the position of the UE 1300)
        An indicator as to whether to add an ECS option when the EASDF 1302 processes the DNS query message received from the UE 1300
        Address of DNS server to be forwarded by EASDF 1302
        EAS IP address range accessible from the associated DNAI (which may be used for registration of routing rules of ULCL)
    edge computing service provider identifier (e.g., service provider ID and/or edge computing service provider ID)
    edge computing subscriber group identifier (or subscriber group identifier);
        A group identifier for providing edge computing services only to subscribers belonging to the subscriber group.
        The SMF 1301 identifies whether a subscriber belongs to a subscriber group from the UDM and then provides a pre-configured DNS response only to the corresponding subscriber.
        Edge computing data network identifier: DNN/S-NSSAI In operation 1370, the EASDF 1302 forwards the DNS query message to the DNS server 1306 based on the EAS domain configuration information included in the DM query response message received from the UDR 1303. The DNS query message forwarded to the DNS server by the EASDF 1302 may include FQDN and/or ECS option.

In operation 1375, the DNS server 1306 creates a DNS answer including the EAS IP address for the DNS query message considering the ECS option included in the DNS query message forwarded from the EASDF 1302 and transmits a DNS response message including the DNS answer to the EASDF 1302.

In operation 1380, the EASDF 1302, which receives the DNS response message from the DNS server 1306, reports information, e.g., the EAS IP address, included in the DNS response message to the SMF 1301 if the received DNS response message meets the DNS processing rule or DNS reporting rule.

In operation 1385, the EASDF 1302 transfers the DNS response message including the EAS IP address received in operation 1375 to the UE 1300.

Figure 14:
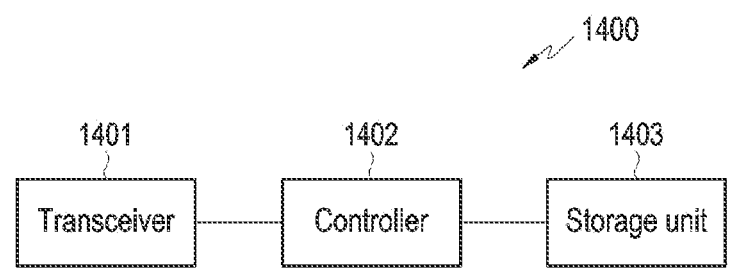
FIG. 14 is a view illustrating a structure of a network entity according to an embodiment of the disclosure.

FIG. 14 is a view illustrating a structure of a network entity(ies) according to an embodiment of the disclosure. The network entity according to the embodiment of FIG. 14 may include the network entities included in FIGS. 1, 2, and 12.

Referring to FIG. 14, a network entity 1400 may include a transceiver 1401, a controller 1402, and a storage unit 1403. The controller 1402 may be defined as a circuit or application-specific integrated circuit or at least one processor.

The transceiver 1401 may transmit and receive signals to/from other network entities. The transceiver 1401 may receive information for obtaining an EAS IP address from, e.g., another network entity or transmit information for obtaining an EAS IP address to the other network entity.

The controller 1402 may control the overall operation of the network entity according to an embodiment. For example, the controller 1402 may control the signal flow between blocks to perform the operations according to the procedures described above in connection with FIGS. 3A and 3B through FIGS. 13A and 13B. For example, the controller 1402 may control the operations proposed in the disclosure to process the DNS message, according to the above-described embodiments, according to the DNS message processing rule.

The storage unit 1403 may store at least one of information transmitted/received via the transceiver 1401 and information generated via the controller 1402. For example, the storage unit 1403 may store EAS domain configuration information according to the above-described embodiments.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a session management function (SMF), the method comprising:
obtaining edge application server (EAS) configuration information provided from an application function (AF);
generating a domain name system (DNS) message processing rule based on the EAS configuration information; and
transmitting, to an edge application server discover function (EASDF) entity, a context message comprising the generated DNS message processing rule,
wherein the EAS configuration information comprises at least one of:
one or more fully qualified domain name (FQDN),
one or more data network access identifiers (DNAIs) for the EAS configuration information, or
one or more DNS server information for each DNAI,
wherein the DNS message processing rule comprises:
an identifier of the DNS message processing rule,
an EAS IP address range related to a DNS response message, and
a reporting-once indication of a DNS message corresponding to the EAS IP address range.

2. The method of claim 1, wherein the EAS configuration information comprises multiple DNS server address for one FQDN.

3. The method of claim 1, wherein the EAS configuration information further comprises at least one of:
one or more enhanced DNS client subnet (ECS) options, or
one or more edge computer area names (ECANs) for one FQDN.

4. The method of claim 1, wherein the AF comprises at least one of a policy control function (PCF), a network exposure function (NEF), or a user data repository (UDR).

5. The method of claim 1, further comprising:
receiving, from the EASDF entity, a report message related to at least one of a DNS query message or a DNS response message,
wherein the DNS query message is received to the EASDF entity from a user equipment (UE), and reported to the SMF via the report message based on the DNS message processing rule, and
wherein the DNS response message is received to the EASDF entity from a DNS server, and reported to the SMF via the report message based on the DNS message processing rule.

6. The method of claim 5, wherein the DNS query message further comprises at least one of fully qualified domain name (FQDN) related to the EAS or an IP address of the UE.

7. The method of claim 5, wherein the DNS server comprises at least one of a central DNS (C-DNS) server or a local DNS (L-DNS) server.

8. The method of claim 1, wherein the context message further comprises at least one of UE identifier of a UE, UE internet protocol (IP) address, Ethernet medium access control (MAC) address of the UE, or subscription permanent identifier (SUPI).

9. A session management function (SMF) comprising:
a transceiver; and
a processor configured to control the transceiver to:
obtain edge application server (EAS) configuration information provided from an application function (AF),
generate a domain name system (DNS) message processing rule based on the EAS configuration information, and
transmit, to an edge application server discover function (EASDF) entity, a context message comprising the generated DNS message processing rule,
wherein the EAS configuration information comprises at least one of:
one or more fully qualified domain name (FQDN),
one or more data network access identifiers (DNAIs) for the EAS configuration information, or
one or more DNS server information for each DNAI, and wherein the DNS message processing rule comprises:
an identifier of the DNS message processing rule,
an EAS IP address range related to a DNS response message, and
a reporting-once indication of a DNS message corresponding to the EAS IP address range.

10. The SMF of claim 9, wherein the EAS configuration information comprises multiple DNS server address for one FQDN.

11. The SMF of claim 9, wherein the EAS configuration information further comprises at least one of:
one or more enhanced DNS client subnet (ECS) options, or
one or more edge computer area names (ECANs) for one FQDN.

12. The SMF of claim 9, wherein the AF comprises at least one of a policy control function (PCF), a network exposure function (NEF), or a user data repository (UDR).

13. The SMF of claim 9, wherein the processor is configured to:
receive, from the EASDF entity, a report message related to at least one of a DNS query message or a DNS response message,
wherein the DNS query message is received to the EASDF entity from a user equipment (UE), and reported to the SMF via the report message based on the DNS message processing rule, and
wherein the DNS response message is received to the EASDF entity from a DNS server, and reported to the SMF via the report message based on the DNS message processing rule.

14. The SMF of claim 13, wherein the DNS query message further comprises at least one of fully qualified domain name (FQDN) related to the EAS or an IP address of the UE.

15. The SMF of claim 13, wherein the DNS server comprises at least one of a central DNS (C-DNS) server or a local DNS (L-DNS) server.

16. The SMF of claim 9, wherein the context message further comprises at least one of UE identifier of a UE, UE internet protocol (IP) address, Ethernet medium access control (MAC) address of the UE, or subscription permanent identifier (SUPI).

* * * * *